US012710554B2

(12) United States Patent
Kindt et al.

(10) Patent No.: US 12,710,554 B2
(45) Date of Patent: Aug. 18, 2026

(54) DETECTOR PIXEL AND ENERGY-RESOLVING PHOTON COUNTING DETECTOR

(71) Applicant: Teledyne DALSA B.V., Eindhoven (NL)

(72) Inventors: Willem Johannes Kindt, Eindhoven (NL); Wasim Muhammad, Eindhoven (NL)

(73) Assignee: Teledyne DALSA B.V., Eindhoven (NL)

( * ) Notice: Subject to any disclaimer, the term of this patent is extended or adjusted under 35 U.S.C. 154(b) by 137 days.

(21) Appl. No.: 18/916,301

(22) Filed: Oct. 15, 2024

(65) Prior Publication Data

US 2025/0180757 A1 Jun. 5, 2025

(30) Foreign Application Priority Data

Nov. 30, 2023 (EP) .................................... 23213497

(51) Int. Cl.
*G01T 1/17* (2006.01)

(52) U.S. Cl.
CPC ..................................... *G01T 1/17* (2013.01)

(58) Field of Classification Search
CPC G01T 1/17; G01T 1/247; G01T 1/171; G01T 1/20; G01T 1/29; H03K 5/1252; H03F 3/45
See application file for complete search history.

(56) References Cited

U.S. PATENT DOCUMENTS

2016/0377745 A1 12/2016 Daerr
2020/0393294 A1* 12/2020 Viswanath ............... G01J 1/44

FOREIGN PATENT DOCUMENTS

EP 4246189 9/2023
WO 2022218901 10/2022

OTHER PUBLICATIONS

Krummenacher, Pixel Detectors with Local Intelligence: An IC Designer Point of View, Nuclear Instruments & Methods in Physics Research, Aug. 1, 1991, pp. 527-532, vol. A305, No. 3, North-Holland, NL.

* cited by examiner

*Primary Examiner* — Courtney D Thomas
(74) *Attorney, Agent, or Firm* — MH2 Technology Law Group, LLP

(57) ABSTRACT

The present disclosure relates to a detector pixel for an energy-resolving photon counting detector, and to a photon counting detector comprising the same. The pixel comprises: a photodetector configured to convert an incident photon into a first signal indicative of an energy of the incident photon; a charge sensitive amplifier (CSA) configured to convert the first signal at an input of the CSA into a CSA output signal at an output of the CSA; and a dark current compensation unit (DCCU) for compensating a dark current of the photodetector. The DCCU comprises a signal following unit configured to provide an intermediate signal that is configured to follow a signal indicative of the CSA output signal, with a first maximum signal change rate in a first direction and a second maximum signal change rate, lower than the first maximum signal change rate, in a second direction opposite the first direction, wherein the second direction is a direction in which the signal indicative of the CSA output signal is configured to change when a photon is incident on the photodetector. The DCCU further comprises a signal generation unit configured to generate a dark current compensation signal based on the intermediate signal and to provide said dark current compensation signal to the CSA.

20 Claims, 12 Drawing Sheets

DETECTOR PIXEL AND ENERGY-RESOLVING PHOTON COUNTING DETECTOR

FIELD

Aspects of the present disclosure generally relate to a detector pixel for an energy-resolving photon counting detector, and to an energy-resolving photon counting detector comprising the same. Aspects of the present disclosure particularly relate to X-ray applications, such as mammography, fluoroscopy, surgery and tomography, extra oral dental, intra-oral dental, and non-medical non-destructive testing applications, such as pipeline inspection and security.

BACKGROUND

Photon counting detectors capable of discriminating photon energies are known in the art. Compared to energy-integrating detectors working in a continuous mode, energy-resolving photon counting detectors are operated in a pulse mode. These detectors are capable of processing and registering the separate absorption events when a photon, such as an X-ray photon, is absorbed by the detector material. Because photons are counted individually, energy-resolving photon counting detectors have the potential to offer superior noise characteristics when compared to energy-integrating detectors. This makes them attractive candidates to be used in computed tomography (CT) applications. For example, using energy-resolving photon counting detectors, contrast agents can be identified much better during a CT scan.

An energy-resolving photon counting detector typically comprises a plurality of detector pixels. Each pixel includes a photodetector configured to convert an incident photon into a first signal indicative of an energy of said incident photon, a charge sensitive amplifier (CSA) configured to convert the first signal into a CSA output signal, and processing circuitry to process the CSA output signal.

The photodetector may have a leakage current associated therewith. This leakage current may be present even in absence of photons incident on the photodetector and is thus commonly referred to as a dark current. The dark current may be integrated by the CSA and may consequently appear as an error source in the second signal output by the processing circuitry. In particular, the dark current adds to the charge generated by an incident photon and creates an error in the energy level detected by the detector pixel. Furthermore, without any further measures, the dark current will be integrated by the CSA until the potential across the feedback network of the CSA is large enough to generate sufficient current to cancel the dark current flowing through said feedback network. In practice, the output voltage required to achieve this may exceed the supply voltage of the CSA, causing it to saturate and preventing proper operation of detector pixel.

To account for the contribution of the dark current to the second signal, dark current compensation can be implemented. Conventionally, this may involve estimating a dark current of the photodetector and providing a dark current compensation signal at the input of the CSA that compensates or at least mitigates the effect of the dark current. The dark current of a photodetector may depend on various conditions, such as the applied bias voltage, temperature, the rate at which photons are incident on the photodetector, and so forth. As a result, dynamic compensation of the dark current is typically preferred.

A known dynamic dark current compensation technique is described in "Pixel detectors with local intelligence: an IC designer point of view" by F. Krummenacher, which technique utilizes a low-pass filter architecture. In particular, conventional techniques involve low-pass filtering an output of the CSA to estimate the dark current and generating a dark current compensation signal accordingly. However, such circuits may not perform optimally at higher photon incidence rates, where a signal average of the signal output by the CSA is further removed from a 'baseline' value corresponding to the output voltage after the CSA is reset, resulting in a mismatch between the estimated dark current and the actual dark current.

As illustrated in FIG. 1A, a mismatch between the dark current compensation signal and the actual dark current may lead to drooping of an output voltage Vesa of the CSA in between photon incidences, with respect to a baseline B to which output voltage Vesa of the CSA is reset. Since the discriminator bank also compares the second signal with respect to baseline B, a measurement error may occur due to the lower maximum value of the second signal.

Therefore, there is a need to accurately compensate the dark current of the photodetector in detector pixels, in particular for energy-resolving photon counting detectors, to thereby improve the measurement accuracy.

SUMMARY

It is an object of the present disclosure to provide a detector pixel and energy-resolving photon counting detector in which the abovementioned problem(s) do not occur, or hardly so.

According to an aspect of the present disclosure, a detector pixel for an energy-resolving photon counting detector is provided. The pixel comprises a photodetector configured to convert an incident photon into a first signal indicative of an energy of the incident photon, a CSA configured to convert the first signal at an input of the CSA into a CSA output signal at an output of the CSA, and a DCCU for compensating a dark current of the photodetector. The DCCU comprises a signal following unit configured to provide an intermediate signal that is configured to follow a signal indicative of the CSA output signal with a first maximum signal change rate in a first direction and a second maximum signal change rate, lower than the first maximum signal change rate, in a second direction opposite the first direction. The second direction is a direction in which the signal indicative of the CSA output signal is configured to change when a photon is incident on the photodetector. The DCCU further comprises a signal generation unit configured to generate a dark current compensation signal based on the intermediate signal and to provide said dark current compensation signal to the CSA.

Here, it is noted that the signal indicative of the CSA output signal may be the CSA output signal itself. Alternatively, it may be a transformed version of the CSA output signal, such as a level-shifted and/or scaled version. In the latter case, the signal indicative of the CSA output signal may be an actual signal provided to the signal following unit, or may be an imaginary or 'virtual' signal followed by the intermediate signal, such that the behavior of the intermediate signal is indicative of the behavior of the CSA output signal.

The applicant has found that the conventional approach of applying a low-pass filter to the output voltage of the CSA to estimate the dark current is prone to errors. Namely, while the approach may be sufficient for lower photon count rates, where the signal average at the output of the CSA mostly depends on the baseline and dark current of the CSA, this does not hold for higher photon count rates where signal pulses due to incoming photons significantly contribute to the signal average.

This is for example illustrated in FIG. 1B, where a signal SL with low photon count rate and another signal SH with high photon count rate are shown. In addition, a solid line is shown in FIG. 1B representing a signal average for both signals SL, SH. As can be seen from FIG. 1B, a difference between the signal average and a 'base level' (i.e., the signal level in absence of a pulse) of signal SH is significantly greater than a difference between the signal average and a base level of signal SL. Dark current compensation ideally regulates the CSA using feedback such that, in absence of incident photons, the baseline voltage remains constant and equal to an expected baseline level of the CSA. However, since low-pass filtering tends towards the average, the dark current may be considerably overestimated with this conventional technique, especially for higher photon count rates. Here, the baseline level of the CSA may correspond to the level to which the CSA is configured to be reset, and thus represents a signal level which the CSA output signal should have in absence of incident photons and in absence of dark currents.

By contrast, and in accordance with the present disclosure, the DCCU provides an asymmetric response to the output of the CSA. In particular, the signal following unit is able to remove or at least reduce the effect of the signal pulse in the CSA output signal, caused by an incident photon, on the dark current compensation by following the signal indicative of the CSA output signal with a lower maximum change rate in a direction of that pulse, compared to a change rate in the opposite direction.

For example, during normal operation, a signal change rate of the intermediate signal may be relatively low when the signal level of the intermediate signal is closer to a baseline level of the CSA than the signal level of the CSA output signal. On the other hand, the signal following unit may be able to follow the signal indicative of the CSA output signal at a relatively faster rate when the signal level of the intermediate signal is further away from the baseline level with respect to the signal level of the CSA output signal during normal operation.

Since the dark current is typically low-frequency, changes in the dark current can still be tracked sufficiently in absence of incident photons in both directions of signal change, while mitigating a response of the DCCU to a (high-frequency) signal pulse in one of the directions due to an incident photon. The pulse may typically have a time duration in a range of 10-100 ns, though the present disclosure is not limited thereto Hence, the dark current can be estimated and compensated more accurately, also leading to a more accurately resolved photon energy by the detector pixel.

The signal generation unit may further comprise a comparing circuit configured to compare the intermediate signal to a reference signal that is based on a baseline level, and to output a result representing said comparison for generating the dark current compensation signal. Furthermore, the output of the comparing circuit may be the dark current compensation signal or may be a control signal for controlling a signal generator to generate the dark current compensation signal. Here, the baseline level may mean a level (e.g., voltage) to which the CSA is reset, either passively or actively, after processing a photon.

The signal following unit may comprise a first signal changing element configured to change a signal level in the first direction in dependence of the signal indicative of the CSA output signal, and a second signal changing element configured to change the signal level of the intermediate signal in the second direction in dependence of the signal indicative of the CSA output signal.

The second signal changing element may comprise a current source, such as a transistor-implemented current source. The current source of the second signal changing element may be deliberately chosen to be relatively small, to thereby limit the pull-up strength of the second signal changing element.

The first signal changing element may comprise a source follower transistor, a control terminal of which is either directly or indirectly connected to the output of the CSA. The source follower transistor is able to follow, with its source voltage, the voltage at its control terminal (e.g., gate terminal). Its response rate (i.e., maximum rate of change) can be deliberately configured to be much higher than that of the second signal changing element by dimensioning the transistor accordingly. Another advantage of this embodiment is that the source follower will not or hardly load the output of the CSA.

The signal generation unit may further comprise a reference transistor configured to provide the reference signal by level shifting the baseline voltage to thereby account for a level shift of the intermediate signal with respect to the output voltage signal of the CSA caused by the source follower transistor. The reference transistor may be similarly configured as the source follower transistor, for example using the same dimensions, to replicate the level shift by the source follower transistor, for example equal to its gate-source voltage. Effectively, the reference transistor may be configured as a source follower, but for the baseline voltage rather than the output voltage signal of the CSA.

The second signal changing element may comprise a further source follower transistor of which a channel is arranged in series with the current source. Furthermore, the signal following unit may further comprise a buffer connected between the output of the CSA and each of the source follower and further source follower, the buffer being configured to provide a respective level-shifted signal to each of the source follower transistor and the further source follower transistor to thereby account for a level shift caused by said source follower transistor and further source follower transistor, respectively.

The above configuration enables providing an intermediate signal that is not or hardly level-shifted with respect to the output voltage signal of the CSA. Thus, the baseline voltage need not be level-shifted prior to comparing it to the intermediate signal. The buffer may include buffer transistors that are diode-connected.

The first signal changing element may comprise a series connection of a first diode and a first resistive element, and the second signal changing element may comprise a series connection of a second diode and a second resistive element. The second signal changing element may be connected in parallel to the first signal changing element, and the second diode being anti-parallel to the first diode. Furthermore, a resistance of the first resistive element may be less than a resistance of the second resistive element. In this embodiment, the second diode and second resistive element together may provide a lower maximum rate of change of the signal level of the intermediate signal compared to the first diode and first resistive element together. In a preferred further embodiment, the first diode and the second diode may be Schottky diodes, which may have a relatively low required forward voltage to operate in forward mode, thus reducing the dead zone in which neither the first diode nor the second diode are forward-biased. However, the present disclosure is not limited thereto.

This may for example be achieved using resistors with different resistance values, or by appropriately dimensioning the first and second diode to effectively realize the first and second resistive elements, respectively, or both.

In a further embodiment, the signal following unit may further comprise an amplifier coupled with a first input thereof between the output of the CSA and the first and second signal changing element. The first and second signal changing elements may then be coupled between an output of the amplifier and an output of the signal following unit, and the output of the signal following unit may coupled to a second input of the amplifier to thereby form a negative feedback loop comprising the amplifier, and the first and second signal changing elements. In doing so, a dead zone, in which neither the first diode nor the second diode would otherwise be forward-biased, can be mitigated.

The first signal changing element may comprise a diode connected to the output of the CSA. In a further embodiment, the second signal changing element may comprise a current source, such as a transistor-implemented current source. In this embodiment, the current source may provide a lower maximum rate of change of the intermediate signal compared to the diode.

The signal generating unit may further comprise a reference diode biased with a reference current source and configured to provide the reference signal by level shifting the baseline voltage to thereby account for a level shift of the intermediate signal with respect to the output voltage signal of the CSA caused by the diode, or the first and/or second diode, whichever is applicable. Accordingly, a level shift caused by the diode, or the first and/or second diode, may be taken into account by providing a reference signal for comparison to the intermediate signal, that is level-shifted with respect to the baseline voltage of the CSA. To that end, the reference diode may be similarly dimensioned to the diode, first diode and/or second diode to provide a similar level-shift.

The signal generating unit may further comprise a first capacitor connected between the output of the comparing circuit and a reference terminal. The output signal of the comparing unit may be defined as a voltage across the first capacitor, which may subsequently be used to generate the dark current compensation signal. For example, the dark current compensation signal may be generated by a signal generator, such as a transistor with its control terminal connected to the output of the comparing circuit, that may be configured to convert said voltage across the first capacitor into a current and to provide said current to the input of the CSA. The reference terminal to which the first capacitor is connected may be a supply voltage or ground.

The signal following unit may further comprise a second capacitor across which the intermediate signal is provided as a voltage. The intermediate signal may be defined as a voltage signal across the second capacitor. A first terminal of the second capacitor may be connected to an input of the comparing circuit, whereas a second terminal of the second capacitor may be connected to a reference terminal, such as a supply voltage or ground.

The CSA may comprise an amplifier and a feedback network comprising a parallel connection of a feedback capacitor and a reset element configured to reset the CSA. In a further embodiment, the reset element may comprise a feedback resistor. Alternatively, the reset element may comprise a feedback transistor, in which case the pixel may further comprise a trigger circuit configured to generate a reset signal for said feedback transistor in dependence of the output voltage signal of the CSA.

The pixel may further comprise a shaper configured to shape the output voltage signal of the CSA into a second signal indicative of the energy of the incident photon. In a further embodiment, the shaper may comprise a differentiator and an integrator.

The pixel may further comprise a discriminator bank comprising a plurality of comparing units. Each comparing unit may be configured to compare the maximum value of the second signal with a respective threshold value and to output a result of the comparison.

The pixel may further comprise a counter array comprising a plurality of counters respectively connected to the plurality of comparing units. Each counter may be configured to cumulatively store the result of the comparison.

The photodetector may comprise a photo-absorbing material, such as Cadmium Zinc Telluride (CZT) or Cadmium Telluride (CdTe). In a further embodiment, the photodetector may be a photodiode or phototransistor.

The CSA output signal may be a voltage signal, the intermediate signal may be a voltage signal, and the baseline level may be a baseline voltage. In other words, the CSA may be configured to convert the first signal (e.g., a charge signal) into an output voltage signal.

According to another aspect of the present disclosure, an energy-resolving photon counting detector is provided. The photon counting detector comprises a plurality of detector pixels, which may be arranged in a matrix of rows and columns. At least one but preferably each pixel is configured as the detector pixel as defined in any of the embodiments of the previous aspect described above.

Although particularly useful for conversion of X-ray photons, the present disclosure is not limited thereto and could instead equally be used for other applications, such as detectors for visible light, infrared light, or the like.

Further aspects and/or embodiments of the present disclosure may become apparent from the detailed description presented below.

BRIEF DESCRIPTION OF THE DRAWINGS

Next, the present disclosure will be described in more detail with reference to the appended drawings, wherein.

Figure 1A:
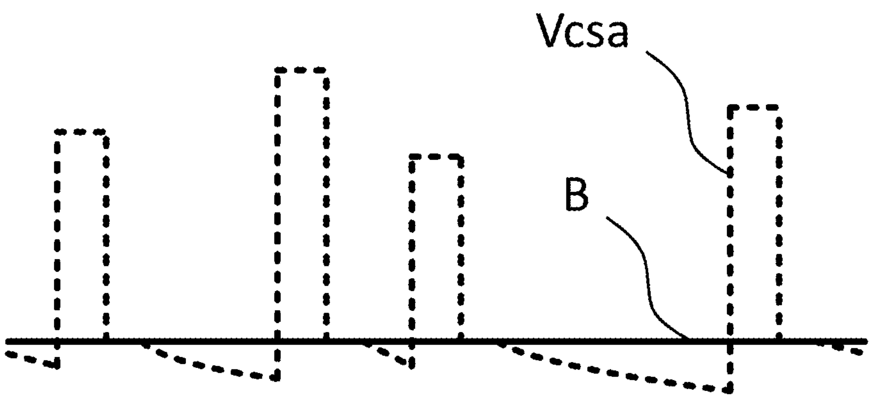
FIG. 1A is an exemplary signal diagram representing an output signal of a CSA with inaccurate dark current compensation.
Figure 1B:
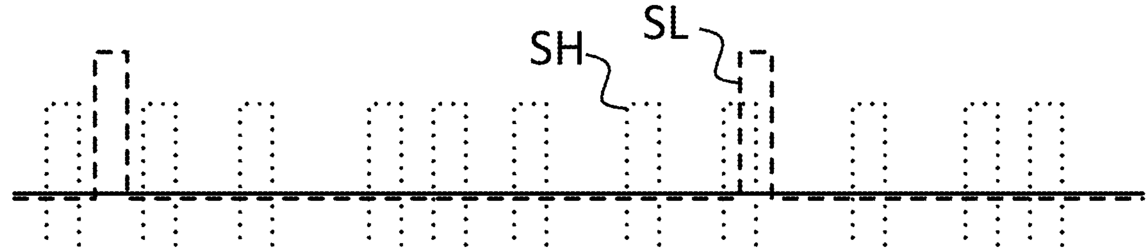
FIG. 1B is a signal diagram representing an output signal of the CSA for a relatively low photon count rate and a relatively high photon count rate

In the appended drawings, identical or similar components and/or features may have been assigned the same reference sign for convenience of explanation. Moreover, if a first component is described with reference to an earlier drawing and a second component in another drawing is assigned the same reference sign, the description of said first component with reference to the earlier drawing may identically or similarly apply to the second component with reference to the other drawing, unless explicitly stated otherwise. For reasons of conciseness, the description for the first component may be omitted for the second component with reference to the other drawing.

DETAILED DESCRIPTION

Unless the context clearly requires otherwise, throughout the description and the claims, the words “comprise”, “comprising” and the like are to be construed in an inclusive sense, as opposed to an exclusive or exhaustive sense; that is to say, in the sense of “including, but not limited to”. As used herein, the terms “connected”, “coupled” or any variant thereof means any connection or coupling, either direct or indirect, between two or more elements; the coupling or connection between the elements can be physical, logical, electromagnetic, or a combination thereof. Additionally, the words “herein”, “above”, “below” and words of similar import, when used in this application, refer to this application as a whole and not to any particular portions of this application. Where the context permits, words in the detailed description using the singular or plural number may also include the plural or singular number respectively. The word “or” in reference to a list of two or more items, covers all of the following interpretations of the word: any of the items in the list, all of the items in the list, and any combination of the items in the list.

The teachings of the technology provided herein can be applied to other systems, not necessarily the system described below. The elements and acts of the various examples described below can be combined to provide further implementations of the technology. Some alternative implementations of the technology may include not only additional elements to those implementations noted below, but also may include fewer elements.

These and other changes can be made to the technology in light of the following detailed description. While the description describes certain examples of the technology, and describes the best mode contemplated, no matter how detailed the description appears, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the appended claims should not be construed to limit the technology to the specific examples disclosed in the specification, unless the detailed description section explicitly defines such terms. Accordingly, the actual scope of the technology encompasses not only the disclosed examples, but also all equivalent ways of practicing or implementing the technology under the appended claims.

In the ensuing description below, reference is made to various transistors. Such references may be interpreted as references to same or different types of transistor technologies, such as bipolar junction transistors (BJTs), field-effect transistors (FETs), insulated-gate bipolar transistors (IGBTs). Sub-types may for example include junction-FETS (JFETs), metal-oxide-semiconductor FETs (MOSFETs) and in particular complementary MOS (CMOS) transistors, or the like. Similarly, when referring to a diode, this may be a reference to various types of diodes, such as PN diodes, PiN diodes, Schottky diodes, Merged-Pin Schottky (MPS) diodes, or the like. The skilled person will appreciate that various combinations can be made, and that the present disclosure is not limited to all transistors and/or diodes being of the same type, or sub-type. Although the present disclosure is not limited thereto, illustrative examples in the detailed description of the present disclosure will be described using CMOS technology.

Figure 2:
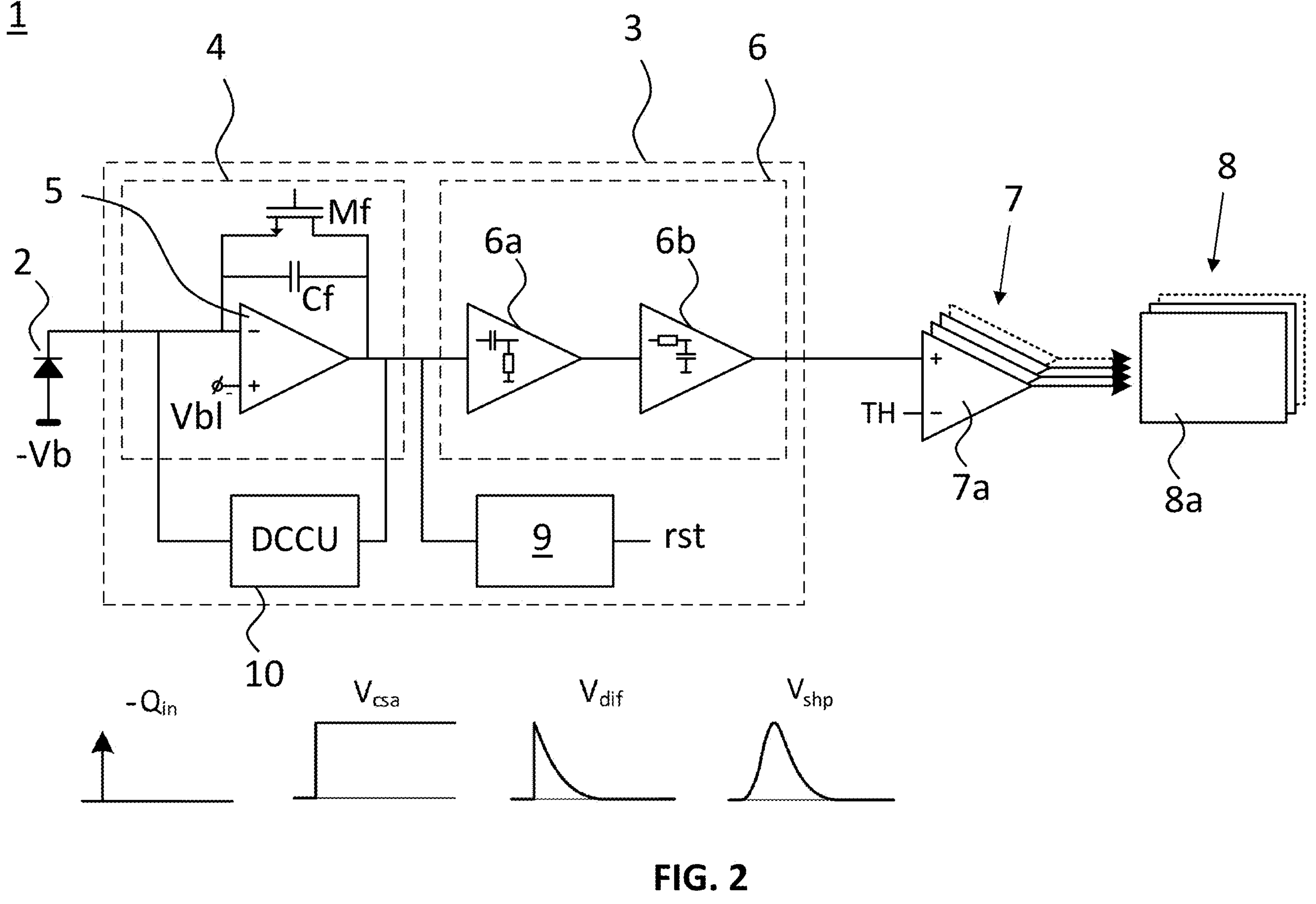
FIG. 2 is a schematic diagram of a detector pixel in accordance with an embodiment of the present disclosure.

FIG. 2 illustrates a schematic example of a detector pixel 1 for an energy-resolving photon counting detector.

Pixel 1 comprises a photodetector 2 configured to output a first signal as a result of absorbing an incident photon, and a detecting unit 3 configured to receive and process said first signal from photodetector 2. Photodetector 2 can for example be in the form of a photodiode as illustrated in FIG. 2, though this need not be the case. For example, photodetector 2 can comprise a piece of photo-absorbing material, such as Cadmium Zinc Telluride (CZT), arranged in between electrodes. A first electrode can be negatively biased using a voltage source-Vb and a second electrode is connected to detecting unit 3. Photodetector 2 outputs the first signal as a result of absorbing a photon. This first signal comprises or is formed by free electrons that are generated by the photon absorption and that are repelled towards the second electrode by the large negative bias being present on the first electrode.

Of course, it is also possible to use a photodetector of opposite polarity and apply a positive bias thereto to instead of a negative bias. In that case, instead of free electrons, the first signal would comprise or be formed by free holes that are generated by the photon absorption and that are repelled towards detecting unit 3. Hereinafter, reference will be made to pixel 1 operating based on a first signal with free electrons, unless explicitly stated otherwise.

Detecting unit 3 generates a second signal in dependence of the first signal. This second signal is subsequently provided to a discriminator bank 7 comprising plurality of comparing units 7*a*. Each comparing unit 7*a* compares the second signal with respective (different) thresholds TH. The outputs of comparing units 7*a* are connected to respective counters 8*a* that are comprised in a counter array 8. After processing many incident photons, the energy spectrum of the incident radiation can be determined by the values stored in counters 8*a*.

In the above, detecting unit 3, discriminator bank 7, and counter array 8 are part of processing circuitry that is configured for processing electrical signals from photodetector 2. Furthermore, photodetector 2 is an example of a photon conversion assembly that directly converts an incident photon (e.g., an X-ray photon) into an electrical signal. However, the present disclosure is not limited thereto, and may similarly apply to indirect conversion detectors, for example using a scintillator to convert incident photons into respective secondary photons that can be processed by photodetector 2.

Detecting unit 3 comprises a charge sensitive amplifier (CSA) 4 configured to convert charge at its input into a voltage at its output. In particular, CSA 4 comprises an amplifying unit 5 and a feedback network comprising a parallel connection of a feedback capacitor Cf and a feedback transistor Mf. In this example, feedback transistor Mf may be inactive (i.e., open, or high impedance) during a measurement. After the measurement, feedback transistor Mf may be briefly activated (i.e., closed, or low impedance) to discharge feedback capacitor Cf and prepare CSA 4 for a subsequent measurement. To that end, detecting unit 3 may further comprise a trigger circuit 9 configured to detect that a photon has been incident based on an output voltage signal of CSA 4, and to provide a reset signal rst to feedback transistor Mf after the measurement has been completed. For example, reset signal rst may be provided to feedback transistor Mf after a predetermined amount of time following a detection of a signal at the output of CSA 4, taking into account the time required for pixel 1 to process the second signal provided by detecting unit 3.

In the above, CSA 4 is described as having an active reset, using feedback transistor Mf. However, CSA 4 with a passive reset is also envisaged by the present disclosure. For example, feedback transistor Mf may be replaced with a resistive element (not shown in FIG. 2), such as a resistor or a transistor-implemented resistive element, with a relatively high resistance. In those cases, trigger circuit 9 may be omitted. When using a passive reset, the time constant of the feedback network should be small enough to be able to sufficiently reset CSA 4 in between measurements, but not too small to avoid the measurement itself being affected. Instead of replacing feedback transistor Mf with a resistive element, the feedback network may also be supplemented with a resistive element connected in parallel to said feedback transistor Mf.

Detecting unit 3 may further comprise a shaper 6. In this example, shaper 6 includes a combination of a differentiator 6*a* and an integrator 6*b*. Shaper 6 may be configured to shape (i.e., prepare) the signal output by CSA 4 into a shaper output signal (i.e., the second signal), in a manner suitable for comparing units 7*a* of discriminator bank 7 to determine a maximum value thereof.

As shown by the corresponding signal shapes illustrated below the various components, the first signal outputted by photodetector 2 corresponds to a spike signal representative for the electrons-Qin that were generated as a result of the absorption of a photon. This signal is processed by CSA 4 and is converted into a signal Vesa of which the step height depends on the energy of the absorbed photon. Signal Vesa is then differentiated by differentiator 6*a* of shaper 6 resulting in a signal Vdif. The differentiation will remove any DC components in signal Vcsa. Next, signal Vdif is integrated by integrator 6*b* of shaper 6 resulting in a signal Vshp emerging as the second signal at the output of detecting unit 3. The maximum value of second signal Vshp is indicative for the energy of the absorbed photon. This maximum value is detected by the discriminator bank 7 using comparing units 7*a*, and a result of the detection is subsequently stored in counters 8*a* of counter array 8.

Pixel 1 further comprises a dark current compensation unit (DCCU) 10, which forms part of a feedback control loop around CSA 4. In practice, a DC loop gain of this feedback control loop will be finite due to the presence of a resistive element in the feedback network of CSA 4, such as a feedback resistor (not shown) of feedback transistor Mf. For example, feedback transistor Mf may be biased weakly in its 'inactive' state to form a high impedance between an input and output of CSA 4 for the purpose of stabilizing the feedback control loop.

DCCU 10 is configured to estimate a dark current of photodetector 2 and to provide a dark current compensation signal to CSA 4 that compensates or at least mitigates the effect of the dark current on the operation of pixel 1. DCCU 10 will be described in more detail below with reference to FIG. 3-15.

Figure 3:
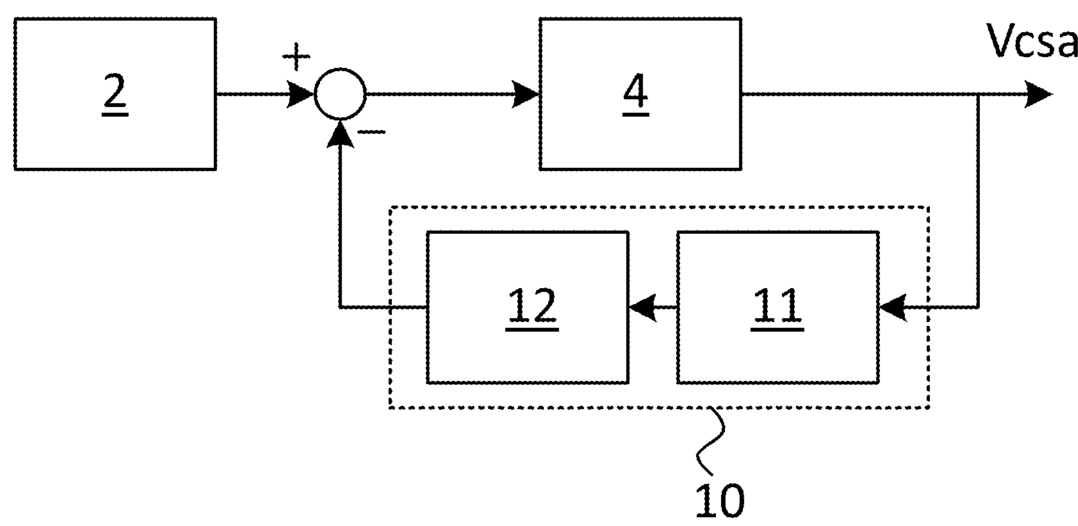
FIG. 3 is a schematic diagram of a detector pixel in accordance with an embodiment of the present disclosure.

FIG. 3 illustrates part of pixel 1 in accordance with an embodiment of the present disclosure. In particular, FIG. 3 shows photodetector 2, CSA 4, and DCCU 10. For convenience of explanation, remaining components of pixel 1, such as shaper 6, discriminator bank 7, counter 8, and trigger circuit 9 as shown in FIG. 2, are omitted from the illustration and corresponding description of FIG. 3.

It is noted that, in the ensuing description below, the description of FIG. 2, also including any omitted components, may apply identically or similarly to any of the embodiments described with reference to FIG. 3 and onwards, unless explicitly stated otherwise. Nevertheless, the present disclosure is not limited thereto, and various alternative implementations and/or modifications of remaining components not shown in FIG. 3 and onwards may be equally applicable. Shaper 6, discriminator bank 7 and counter array 8 of pixel 1 may be collectively referred to a signal processing circuitry for processing the output signal of the CSA.

Referring to FIG. 3, photodetector 2 provides a first signal to the input of CSA 4, which converts the first signal into a CSA output signal. DCCU 10 is connected between the input and output of CSA 4. In particular, DCCU 10 comprises a signal following unit 11 and a signal generation unit 12. Signal following unit 11 provides an intermediate signal to signal generation unit 12. In turn, signal generation unit 12 generates a dark current compensation signal based on said intermediate signal and provides it to the CSA 4 to compensate for the dark current from photodetector 2. Although FIG. 3 illustrates a subtracting element at the input of CSA 4, this could alternatively be a summing element, for example by inverting a polarity of the dark current compensation signal provided by signal generation unit 12.

In accordance with the present disclosure, the intermediate signal is configured to follow, with its signal level, the CSA output signal or a scaled and/or level-shifted version thereof representing said CSA output signal. However, the maximum signal change rate, i.e., the following capability of the intermediate signal provided by signal following unit 11, is made dependent on a direction in which the intermediate signal is supposed to change to follow the CSA output signal. In particular, signal following unit 11 is able to change the intermediate signal with a change rate of up to a first maximum signal change rate in a first direction and up to a second maximum signal change rate in a second direction opposite the first direction. The signal following unit 11 may be configured such that the second maximum signal change rate is lower than the first maximum signal change rate. The second direction is defined by a direction in which the signal indicative of the CSA output signal is configured to change when a photon is incident, for the purpose of removing the effect of a signal pulse on the dark current compensation.

The signal indicative of the CSA output signal may be the CSA output signal itself, or a modified version thereof. For example, additional components may be connected between CSA 4 and DCCU 10, such as an amplifier and/or a buffer, that are configured to modify the CSA output signal before providing the modified CSA output signal to DCCU 10. Such a modified CSA output signal may nevertheless be indicative of the CSA output signal, in particular its signal behavior. DCCU 10 may be configured to take into account a difference between the signal indicative of the CSA output signal and the actual CSA output signal, if any, by processing the intermediate signal accordingly.

Here, 'following' by the intermediate signal of the signal indicative of the CSA output signal may mean that the signal level of the intermediate signal represents a behavior of said signal indicative of the CSA output signal, taking into account the maximum signal change rate of the intermediate signal. For example, the signal level of the intermediate signal may, over time, converge towards the exact signal level of the signal indicative of the CSA output signal based on the first and second maximum signal change rate defined above, or may be level-shifted and/or scaled with respect thereto to follow the signal indicative of the CSA output signal at a 'distance'.

Figure 4:
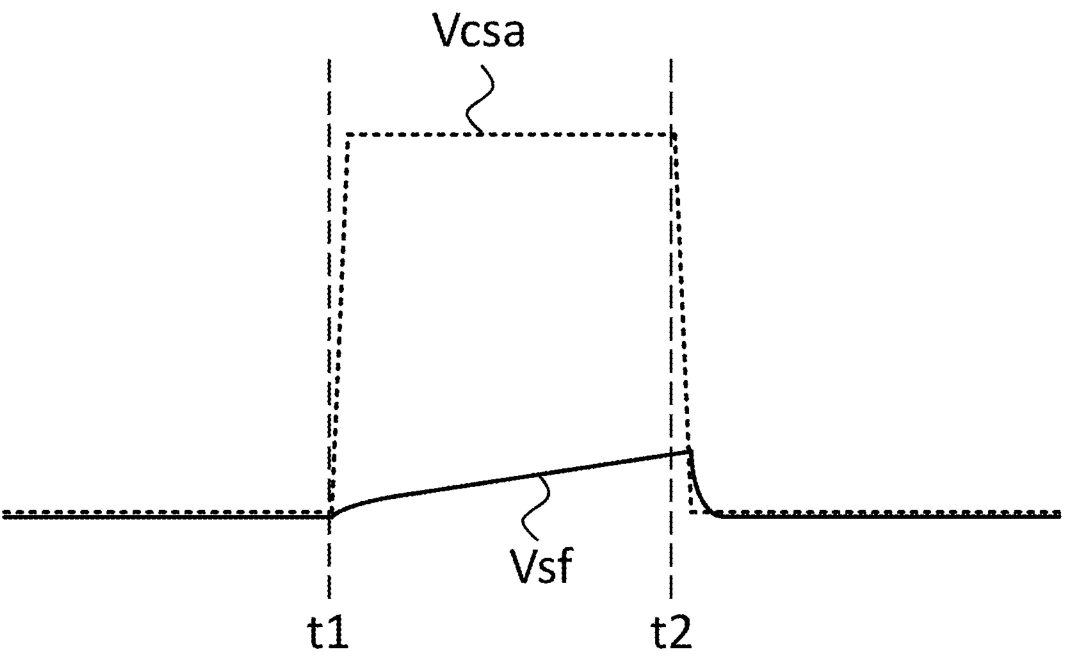
FIG. 4 is a signal diagram illustrating an intermediate signal and an output signal of the CSA over time for the pixel of FIG. 3.

The concept described with reference to FIG. 3 is illustrated using FIG. 4, which shows the CSA output signal as an output voltage signal Vesa over time, as well as the intermediate signal Vsf. In particular, the example shown in FIG. 4 illustrates the effect of a signal pulse, due to an incident photon, on CSA output signal Vesa and the intermediate signal Vsf in accordance with the present disclosure. In this example, the signal indicative of the CSA output signal corresponds to output voltage signal Vcsa.

Prior to first a time instance t1, there is no incident photon, and output voltage signal Vcsa corresponds roughly to the baseline level to which it is normally reset. Here, for convenience, it is assumed that the dark current is absent or is already compensated by DCCU 10, resulting in output voltage signal Vesa of CSA 4 remaining approximately at the baseline level in absence of incident photons.

At time instance t1, a photon is incident on photodetector, causing a signal pulse to appear at the output of CSA 4. Intermediate signal Vsf of signal following unit 11 then follows or tracks output voltage signal Vesa, but is more limited in the maximum rate of change in this polarity direction with respect to the opposite polarity direction in accordance with the present disclosure. In particular, intermediate signal Vsf at this stage is closer to the baseline level than output voltage signal Vcsa, and consequently, intermediate signal Vsf has a more limited signal change rate for following output voltage signal Vcsa.

At a second time instance t2, CSA 4 is reset to its baseline level again, causing the output voltage signal Vcsa to drop. Once output voltage signal Vesa drops below the signal level of intermediate signal Vsf, the polarity direction in which signal following unit 11 follows output voltage signal Vcsa changes. Due to the higher maximum rate of change for this polarity direction, intermediate signal Vsf can respond much faster to the change in output voltage signal Vcsa. In particular, intermediate signal Vsf at this stage is further removed from the baseline level than output voltage signal Vcsa, and consequently, intermediate signal Vsf has a higher signal change rate for following output voltage signal Vcsa. In this manner, DCCU 10 hardly responds to the relatively high-frequency signal pulse, while still being able to respond to low-frequency changes in output voltage signal Vesa. This is especially advantageous since dark current is not necessarily static, and may change over time due to various factors, such as a change in temperature of photodetector 2.

Figure 5:
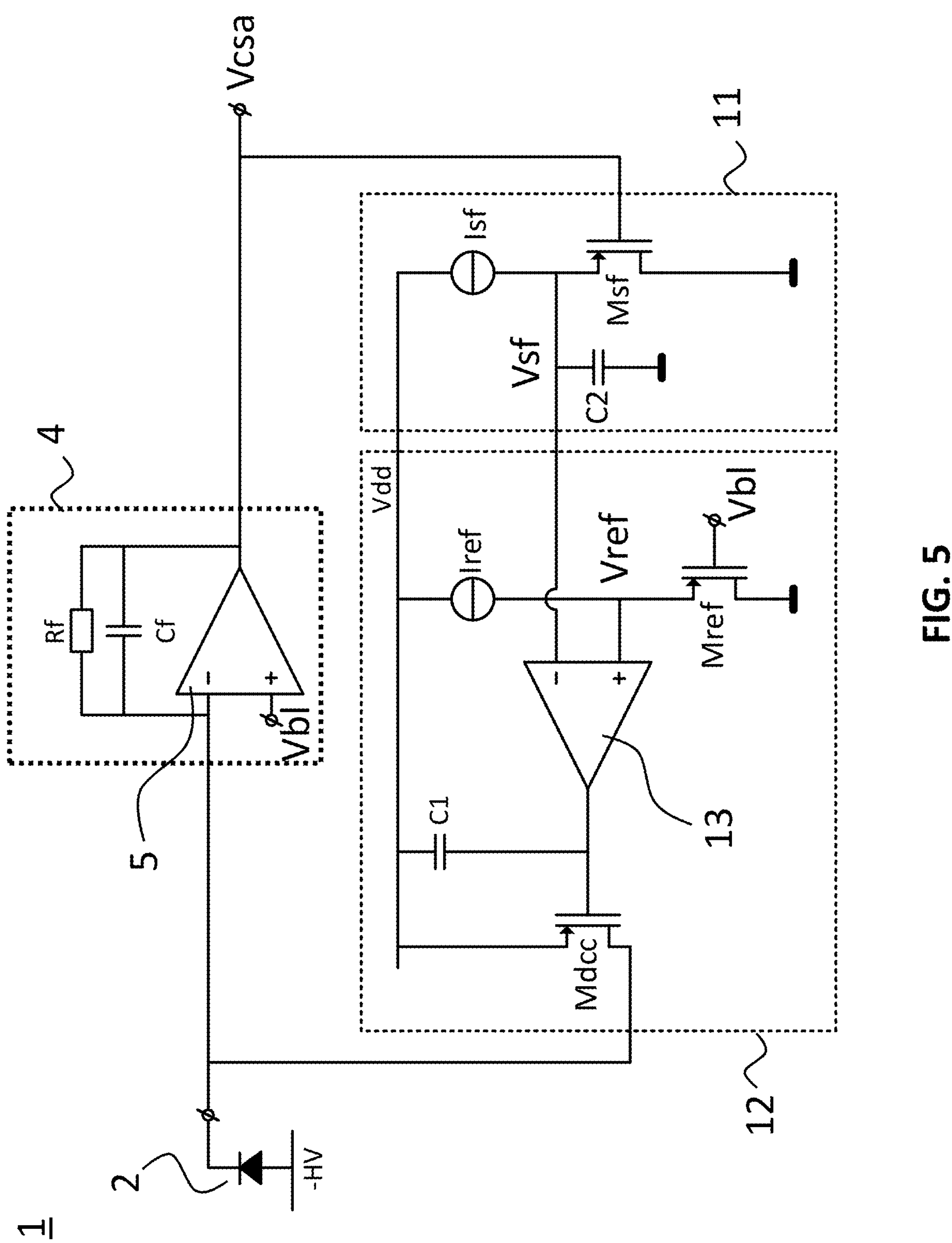
FIG. 5 is a more detailed schematic diagram of the detector pixel of FIG. 3 in accordance with an embodiment of the present disclosure.

FIG. 5 illustrates a more detailed schematic diagram of part of pixel 1 of FIG. 3 in accordance with an embodiment of the present disclosure.

Photodetector 2 may be connected to the input of CSA 4 and may be negatively biased using a negative high voltage-HV. In this implementation, when a photon is incident, free electrons may be generated by the absorption of said incident photon and may be repelled towards CSA 4. Therefore, the first signal outputted by photodetector 2 has a negative polarity, and output voltage signal Vesa of CSA 4 may consequently have a positive polarity.

CSA 4 comprises amplifier 5, and a feedback network comprising feedback capacitor Cf and a feedback resistor Rf. This implementation shows a passive reset using feedback resistor Rf, but may be replaced with an active reset using a transistor, such as feedback transistor Mf as shown in FIG. 2. In all embodiments shown in FIG. 5 and onwards, feedback resistor Rf may be replaced with feedback transistor Mf in combination with trigger circuit 9 as described with reference to FIG. 2, which feedback transistor Mf may be biased to form a high impedance (i.e., when 'deactivated') or a low impedance (i.e., when 'activated').

In this embodiment, signal following unit 11 comprises a first signal changing element for changing the signal level of intermediate signal Vsf in a direction of the first polarity, and a second signal changing element for changing the signal level of intermediate signal Vsf in a direction of the second polarity. In particular, the first signal changing element comprises a source follower transistor Msf, whereas the second signal changing element comprises a current source Isf, which may be a transistor-implemented current source, as will be appreciated by the skilled person.

The signal changing strength of current source Isf is configured to be less than that of source follower transistor Msf by making the current provided by current source Isf relatively small, and appropriately sizing source follower transistor Msf for a relatively large current. In this example, intermediate signal Vsf is defined as a voltage across a second capacitor C2, which voltage is controlled by the first and second signal changing element.

When output voltage signal Vesa of CSA 4 is lower than intermediate signal Vsf minus a threshold voltage of source follower transistor Msf, source follower transistor Msf is active and discharges second capacitor C2 to pull down intermediate signal Vsf. However, when output voltage signal Vcsa of CSA 4 is higher than intermediate signal Vsf minus the threshold voltage of source follower transistor Msf, source follower transistor Msf is not active and current source Isf charges second capacitor C2. By dimensioning current source Isf and source follower transistor Msf accordingly, the voltage changing rate across second capacitor C2 can be made asymmetrical for positive and negative changes in signal level.

Intermediate signal Vsf is then provided to signal generation unit 12, which in this example comprises a comparing circuit 13 having a first input connected to second capacitor C2. A second input thereof is connected to a reference voltage Vref that depends on a baseline voltage Vbl to which CSA 4 is reset after the signal pulse corresponding to an incident photon is processed. However, since source follower transistor Msf introduces, when active, a level shift between output voltage signal Vesa and intermediate signal Vsf, a reference transistor Mref is introduced to also level-shift baseline voltage Vb in a similar manner. Reference transistor Mref may be biased using reference current Iref.

Comparing circuit 13 is configured to output a result of comparing intermediate signal Vsf and reference signal Vref. This comparison result is indicative of a deviation between the baseline voltage and output voltage signal Vcsa, and is thus also indicative of any dark current component still present at the input of CSA 4. Accordingly, comparing circuit 13 may be implemented such that the output of comparing circuit 13 may be used directly as the dark current compensation signal or, as shown in FIG. 5, such that it may be used as a control signal for a signal generator Mdcc (e.g., a transistor as shown in FIG. 5), which converts the control signal into a current and provides said current to the input of CSA 4. Signal generation unit 12 in this example further comprises a first capacitor C1, which may also be referred to as an output capacitor throughout the present disclosure, connected between a supply rail Vdd and the output of comparing circuit 13. The control signal in this example is defined as the voltage at a control terminal of signal generator Mdcc.

Figure 6:
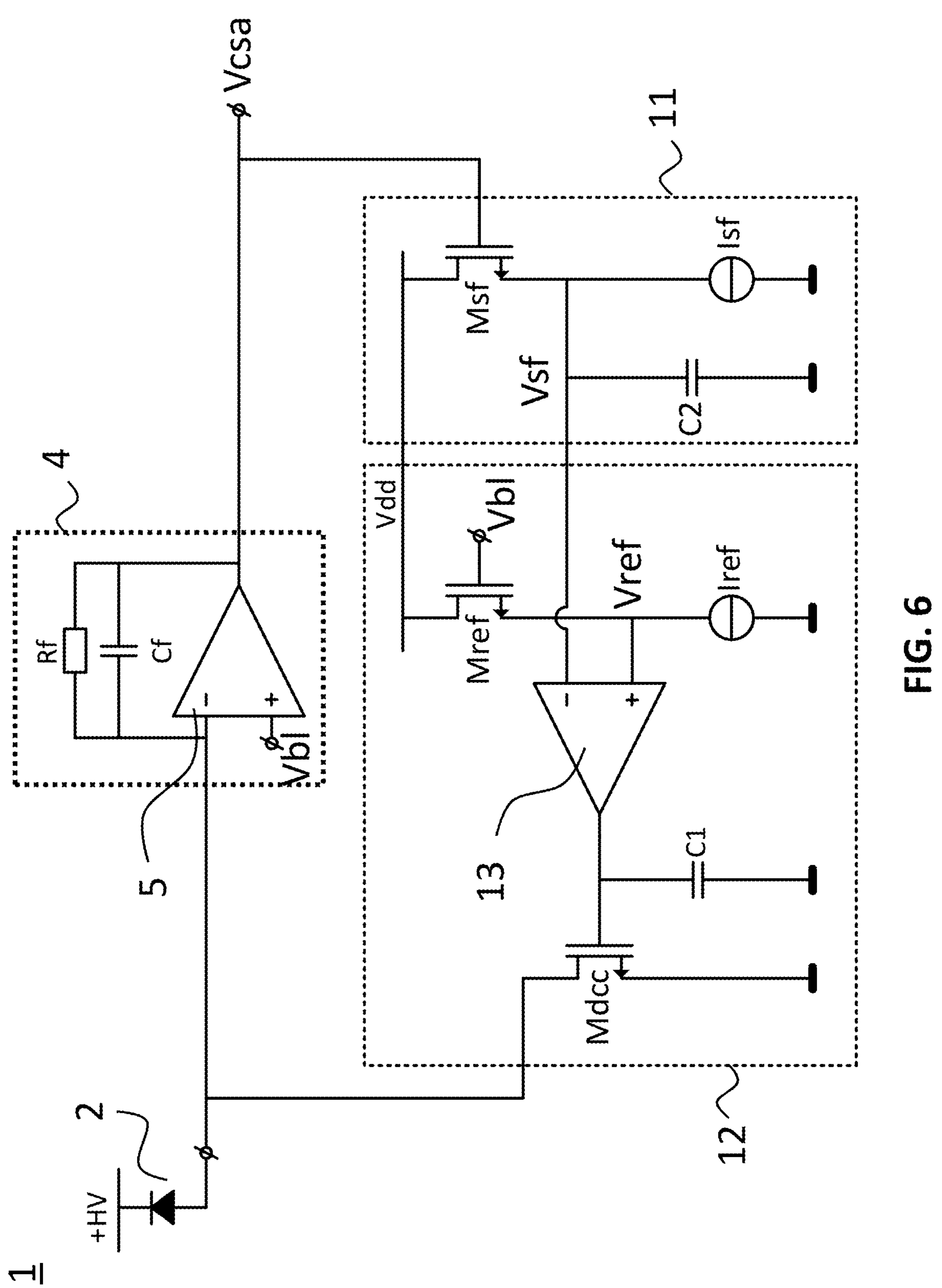
FIG. 6 is a more detailed schematic diagram of the detector pixel of FIG. 3 in accordance with an embodiment of the present disclosure.

FIG. 6 illustrates another implementation of pixel 1 of FIG. 3 in accordance with the present disclosure. This implementation differs from the implementation shown in FIG. 6 in that the polarity of the first signal is inverted. In particular, photodetector 2 is now biased with a positive high voltage +HV. To account for this, signal following unit 11 is adapted by swapping the signal changing strengths of the respective circuits thereof described with reference to FIG. 6. In particular, source follower transistor Msf now pulls up intermediate signal Vsf when active, whereas current source Isf pulls down intermediate signal Vsf. Signal generation unit 12 can be similarly adapted by reversing a current direction of signal generator Mdcc, and reversing a level shifting direction of reference transistor Mref. However, the operating principles may otherwise be analogous to that of FIG. 5, and a detailed description thereof with reference to FIG. 6 is therefore omitted.

Figure 7:
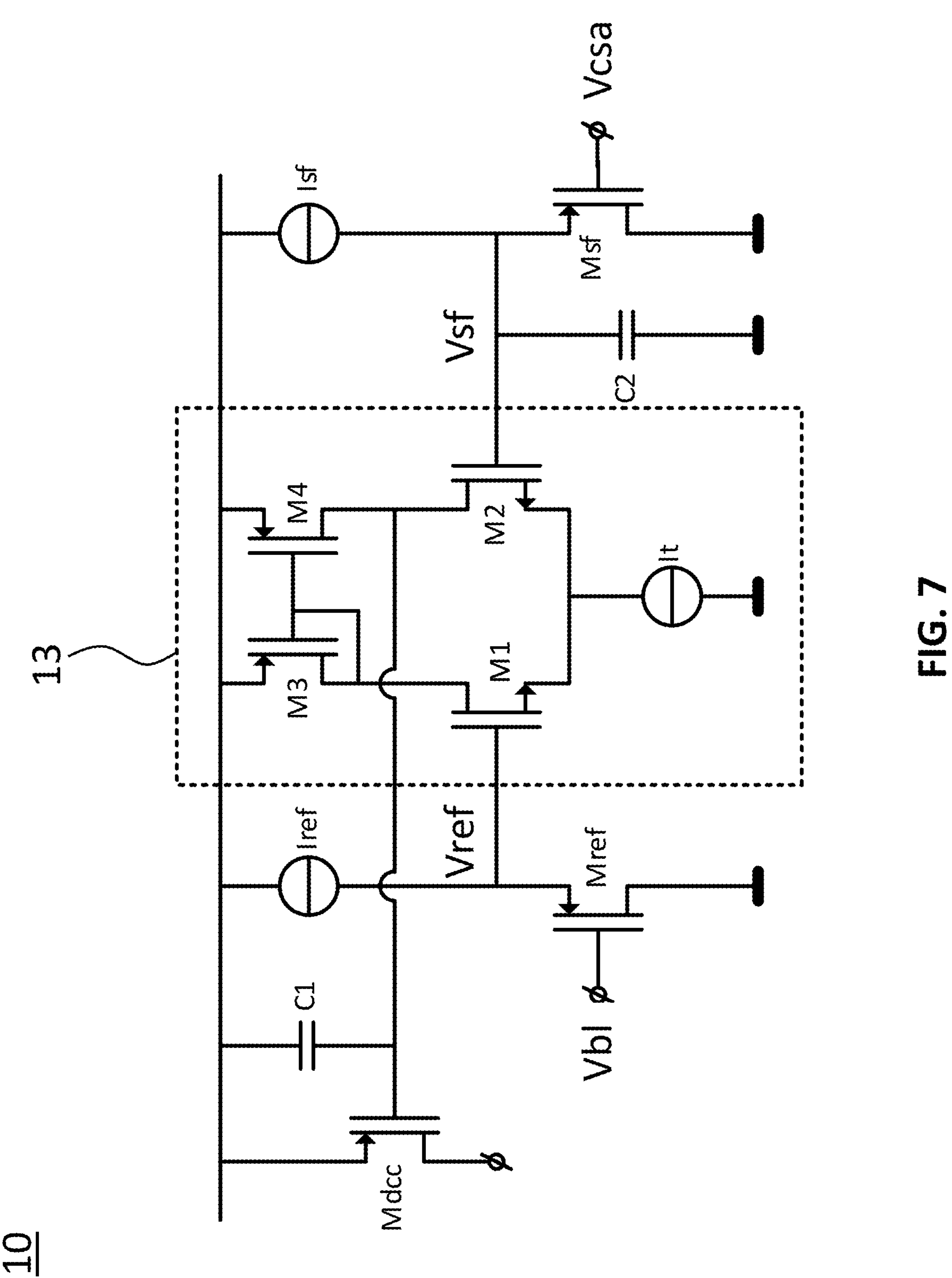
FIG. 7 is a more detailed schematic diagram of the DCCU of the detector pixel of FIG. 3 in accordance with an embodiment of the present disclosure.

FIG. 7 illustrates a more detailed implementation of DCCU 10 of detector pixel 1 as shown in FIG. 3, in accordance with an embodiment of the present disclosure. For example, FIG. 7 may illustrate a more detailed implementation of DCCU 10 as shown in FIG. 5. A description of components and elements already discussed with reference to FIGS. 3 and 5 is omitted. In fact, signal following unit 11 and signal generation unit 12 of FIGS. 3 and/or 5 may be replaced with DCCU 10 as shown in FIG. 7.

Comparing circuit 13 may be implemented as an operational transconductance amplifier (OTA), for example including transistors M1-M4. In particular, comparing circuit 13 may include a differential pair of input transistors M1, M2. A first transistor M1 is connected to reference voltage Vref, and a second transistor M2 is connected to intermediate signal Vsf. A third and fourth transistor M3, M4 form a current mirror. The differential pair may be biased using a tail current source It. The skilled person will appreciate that the present disclosure is not limited to specific types of comparing circuits, and that other types of comparing circuits may be used to replace the OTA shown in FIG. 7.

Figure 8:
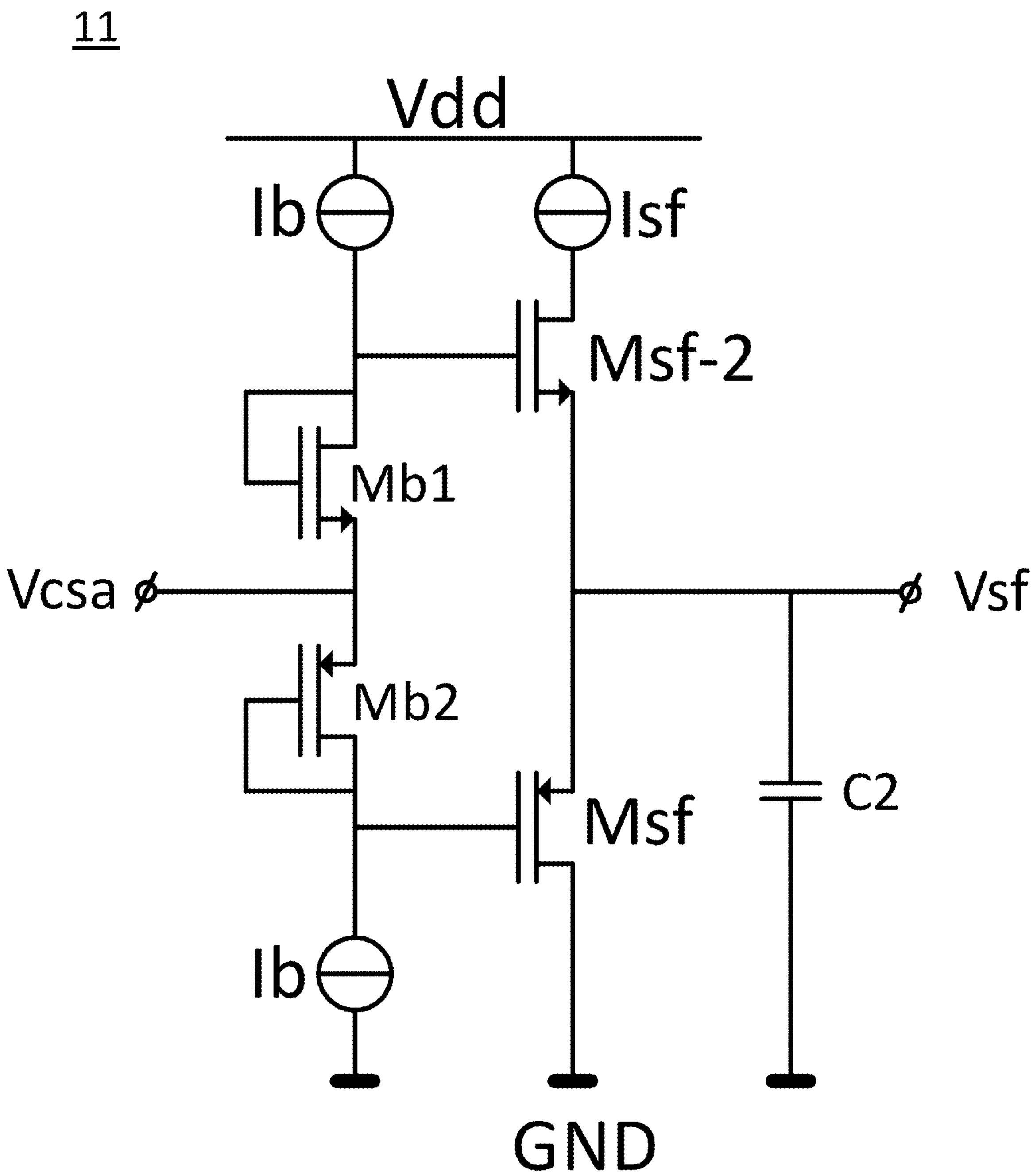
FIG. 8 is a schematic diagram of a signal following unit of the detector pixel of FIG. 3 in accordance with an embodiment of the present disclosure.

FIG. 8 illustrates a signal following unit 11 according to another embodiment of the present disclosure, which may replace signal following unit 11 as shown in FIG. 5-7.

Here, signal following unit 11 comprises a buffer, realized in this example using a diode-connected first buffer transistor Mb1 and second buffer transistor Mb2, which are biased using biasing current source(s) Ib. Furthermore, the first signal changing element includes source follower transistor Msf, and the second signal changing element further includes a further source follower transistor Msf-2 in addition to current source Isf. In this example, first and second buffer transistors Mb1, Mb2 may be similarly dimensioned as source follower transistor Msf and further source follower transistor Msf-2. Thus, a level shift by first buffer transistor Mb1 may effectively counteract a level shift by further source follower transistor Msf-2, and a level shift by second buffer transistor Mb2 may effectively counteract a level shift by source follower transistor Msf, and intermediate signal Vsf may be unshifted with respect to output voltage signal Vesa in steady state.

Similarly to FIGS. 5-7, an asymmetric response to the output signal of CSA 4 can be realized by deliberately limiting the current provided by current source Isf. For example, in the embodiment shown in FIG. 7, a pull-up strength is determined by current source Isf, whereas the pull-down strength is determined by source follower transistor Msf. By deliberately selecting the current provided by current source Isf to be relatively low compared to the current sinking ability of source follower transistor Msf, a different maximum signal change rate can be set for different directions of signal change.

In this embodiment of signal following unit 11, there is no need for reference transistor Mref in signal generation unit 12 as described with reference to FIG. 5, since comparing circuit 13 can now accurately compare intermediate signal Vsf directly with baseline voltage Vb. Hence, reference transistor Mref and reference current source Iref may then be omitted, and baseline voltage Vbl may be directly provided to comparing circuit 13.

Figure 9:
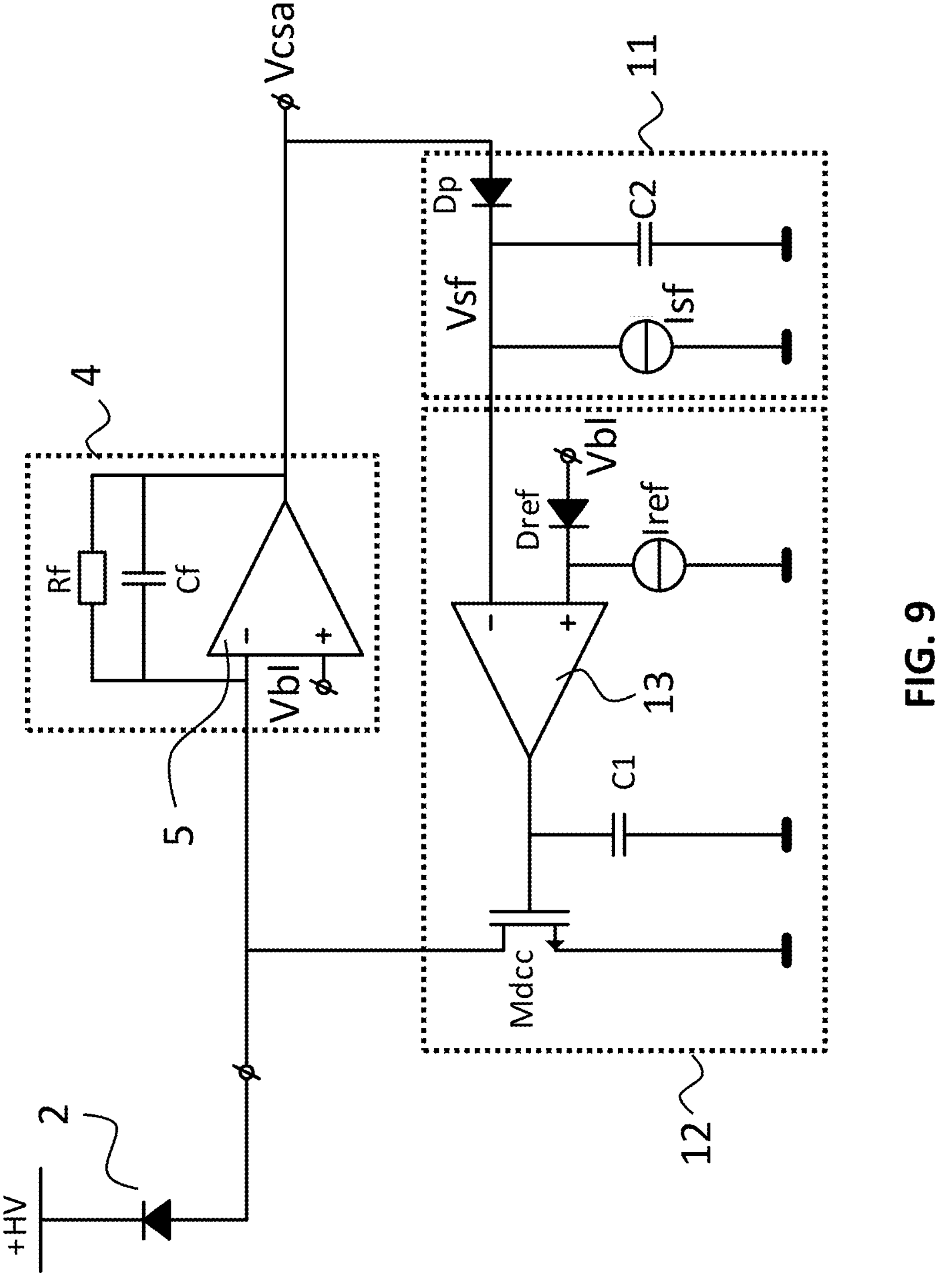
FIG. 9 is a more detailed schematic diagram of the detector pixel of FIG. 3 in accordance with an embodiment of the present disclosure.

FIG. 9 illustrates a more detailed implementation of pixel 1 as shown in FIG. 3, according to yet another embodiment of the present disclosure. This implementation differs from the implementation shown in FIG. 6 in that, instead of a source follower transistor, a diode Dsf is included in signal following unit 11 as the first signal changing element. Diodes such as diode Dsf may provide a rectifying functionality and may as such be substantially unidirectional. In this example, when output voltage signal Vcsa is greater than the signal level of intermediate signal Vsf, diode Dsf becomes forward-biased and a current through diode Dsf can charge second capacitor C2. Conversely, when output voltage signal Vesa is less than the signal level of intermediate signal Vsf, diode Dsf is not forward-biased and thus represents a high impedance, allowing current source Isf to discharge second capacitor C2. By deliberately choosing the current provided by current source Isf to be very small compared to a current capability of diode Dsf, an asymmetric response to output voltage signal Vesa can be created.

To account for a level shift (i.e., voltage drop) across diode Dsf, baseline voltage Vbl may be applied to a reference diode Dref biased by reference current source Iref, which level-shifts baseline voltage Vbl similarly to the level shift of intermediate signal Vsf with respect to output voltage signal Vcsa due to diode Dsf. To that end, diode Dsf and reference diode Dref may be similarly dimensioned or configured to have a same or similar forward voltage.

Similarly to FIGS. 5 and 6, illustrating corresponding schematic diagrams but with reversed polarities, it is also envisaged in the present disclosure that the polarities for FIG. 9 can be reversed. In particular, while photodetector 2 in this case provides the first signal in the form of free holes (i.e., positive charge), an implementation where photodetector 2 provides the first signal in the form of free electrons (i.e., negative charge) is equally envisaged by adapting signal following unit 11 and signal generation unit 12 accordingly.

Figure 10:
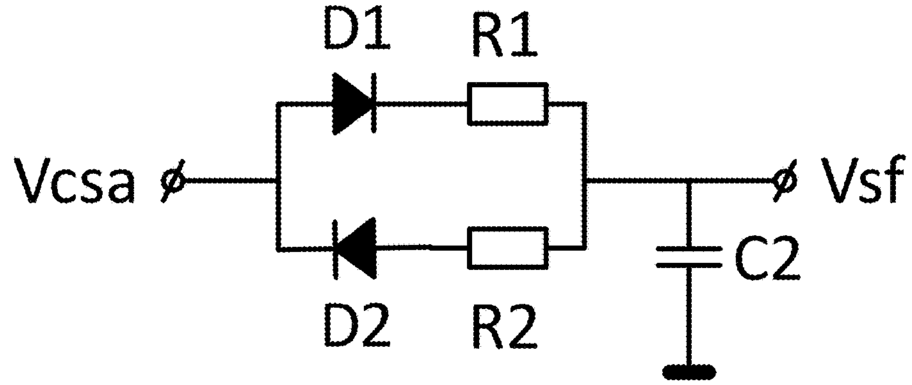
FIG. 10 is a schematic diagram of a signal following unit of the detector pixel of FIG. 3 in accordance with an embodiment of the present disclosure.

FIG. 10 illustrates signal following unit 11 according to another embodiment of the present disclosure, which may replace signal following unit 11 as shown in FIG. 9.

In this embodiment, signal following unit 11 comprises a first diode D1 in series with a first resistive element R1, connected in parallel to a series connection of a second diode D2 and a second resistive element R2. First and second resistive element R1, R2 may be integrated with first and second diode D1, D2, respectively, or may be provided as separate resistors. In the former case, first and second resistive element R1, R2 may be implemented by accordingly dimensioning first and second diode D1, D2, respectively.

First resistive element R1 and first diode D1 may together form the first signal changing element, and second resistive element R2 and second diode D2 may together form the second signal changing element. To ensure that the first signal changing element has a greater signal changing capability with respect to the second signal changing element, first resistive element R1 may have a smaller associated resistance than second resistive element R2.

Figure 11:
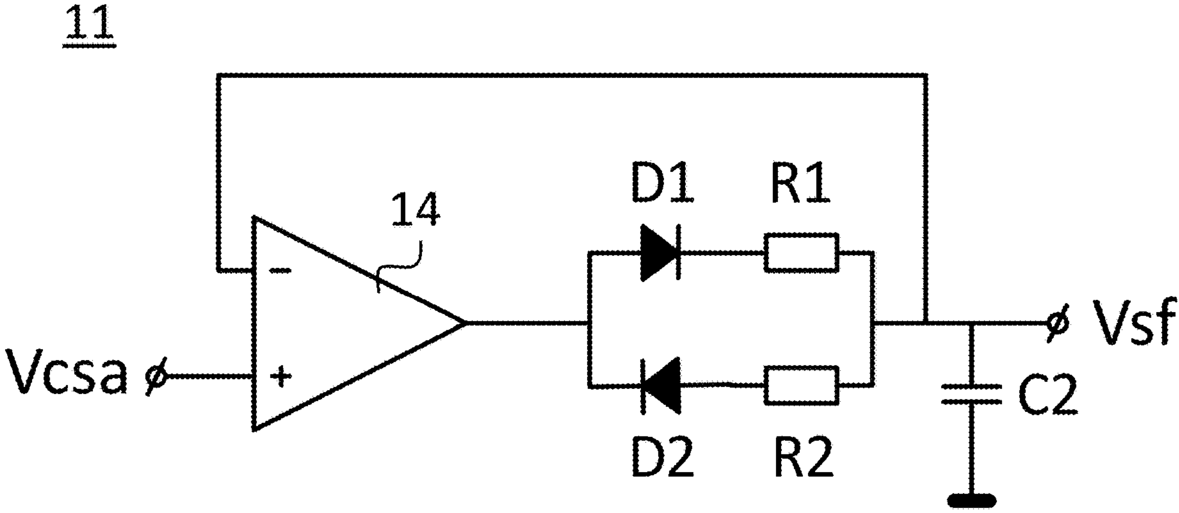
FIG. 11 is a schematic diagram of a signal following unit of the detector pixel of FIG. 3 in accordance with an embodiment of the present disclosure.

FIG. 11 illustrates signal following unit 11 according to another embodiment of the present disclosure. This embodiment differs from the embodiment shown in FIG. 10 in that a buffer 14 is provided. Buffer 14 may be an amplifier, such as an operational amplifier, and may prevent or at least mitigate a loading of CSA 4 by signal following unit 11.

In addition, buffer 14 may be configured to compensate for a dead band during which neither first diode D1 nor second diode D2 of FIG. 10 would be forward-biased. In particular, in the event that Vsf is lower than Vesa, the output of buffer 14 becomes high and the voltage across second capacitor C2 is pulled up through first resistor R1 and first diode D1 until Vsf equals Vcsa. The maximum signal change rate in this direction is limited by a first low-pass filter formed by first resistor R1, first diode D1, and second capacitor C2. On the other hand, if Vsf is higher than Vcsa, the output of buffer 14 becomes low and the voltage across second capacitor C2 is pulled down through second resistor R2 and second diode D2 until Vsf equals Vcsa. The maximum signal change rate in this direction is limited by a second low-pass filter formed by second resistor R2, second diode D2, and second capacitor C2. By appropriately dimensioning first resistor R1, second resistor R2, first diode D1, and/or second diode D2, an asymmetric response to Vesa can be realized.

Figure 12:
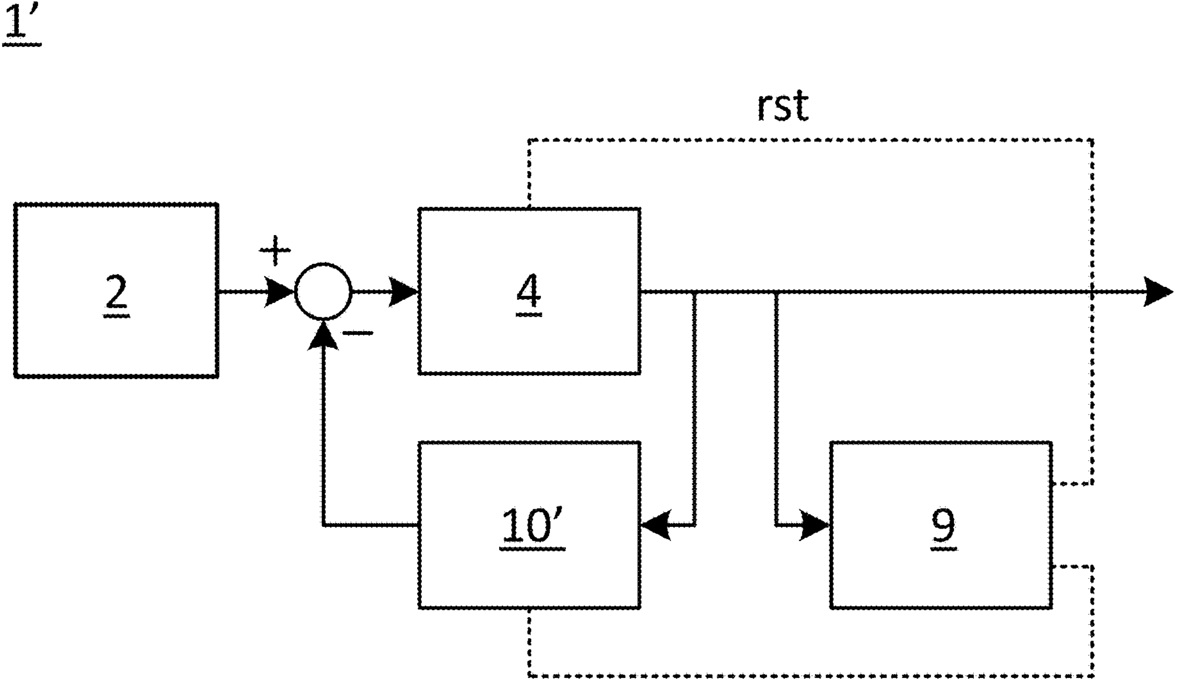
FIG. 12 is a schematic diagram of a detector pixel in accordance with an embodiment of the present disclosure.

FIG. 12 illustrates part of a pixel 1' according to another embodiment of the present disclosure. Pixel 1' comprises photodetector 2, CSA 4 and trigger circuit 9, in a similar fashion to FIG. 2. Although not shown, pixel 1' may further comprise remaining signal processing circuitry configured to process the output voltage signal of CSA 4. Pixel 1' further comprises a DCCU 10'.

As shown in FIG. 12 with dotted lines, trigger circuit 9 may provide respective control signals to CSA 4 and DCCU 10'. In this embodiment, trigger circuit 9 is configured to reset CSA 4 using reset signal rst after the first signal from an incident photon has been processed by pixel 1', e.g., by activating feedback transistor Mf as shown in FIG. 2.

In accordance with the present disclosure, DCCU 10' is configured to be operable in a first mode and in a second mode. In the first mode, DCCU 10' is configured to generate a dark current compensation signal in dependence of a difference between the output voltage signal of CSA 4 and the baseline voltage of CSA 4. In the second mode, DCCU 10' is configured to substantially maintain a signal level of the dark current compensation signal regardless of the output voltage signal of CSA 4. For example, the second mode may temporarily disable the comparison between the output voltage signal and the baseline voltage.

Furthermore, in accordance with the present disclosure, trigger circuit 9 is further configured to detect that a photon has been incident on the photodetector. For example, trigger circuit 9 may detect that a photon has been incident based on the output voltage signal of CSA 4. Furthermore, based on determining that a photon has been incident, trigger circuit 9 is configured to control DCCU 10' to temporarily operate in the second mode before operating in the first mode again. For example, trigger circuit 9 may use a trigger control signal Sc to cause DCCU 10' to operate in the second mode as described above until the signal pulse due to the incident photon has been processed by pixel 1'. In other words, a duration of temporarily operating in the second mode may correspond to a time period required for pixel 1' to process the first signal from photodetector 2 due to an incident photon. Afterwards, trigger circuit 9 may cause DCCU 10' to operate in the first mode again to continue dynamically compensating the dark current from photodetector 2.

Trigger circuit 9 may provide reset signal rst and/or trigger control signal Sc as digital signals, though the present disclosure is not necessarily limited thereto.

As described above, in accordance with the present disclosure the dark current compensation provided by DCCU 10' as described above is temporarily fixed when a signal needs to be processed by pixel 1', to prevent the signal from influencing the dark current compensation or at least reduce its effect. In doing so, the dark current can be more accurately estimated and compensated.

Figure 13:
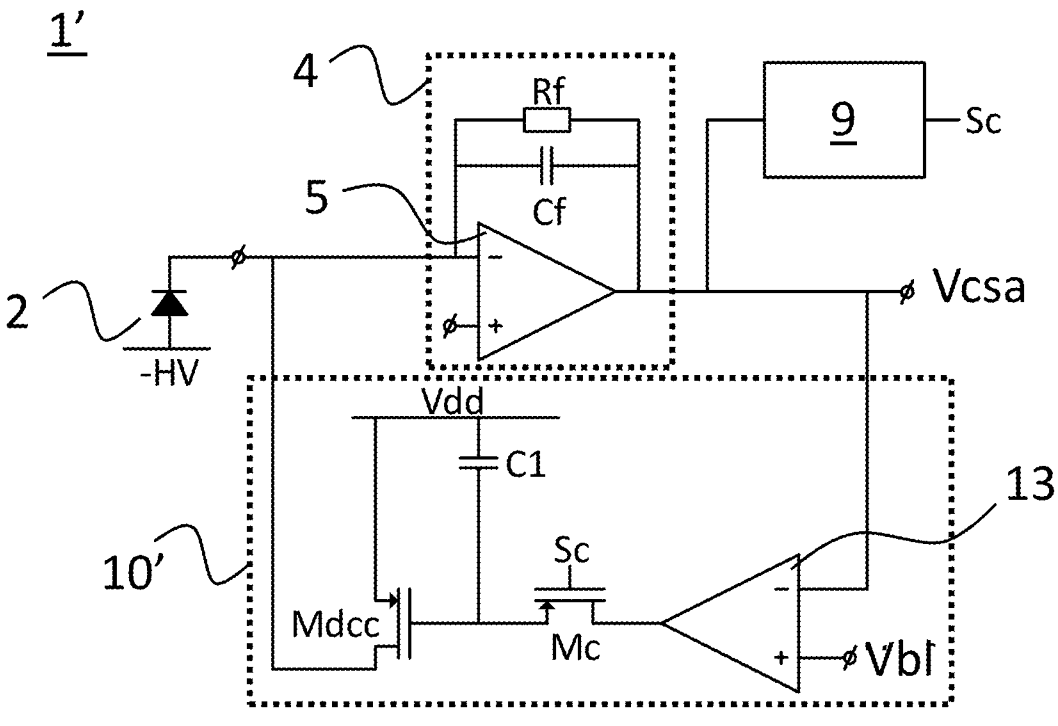
FIG. 13 is a more detailed schematic diagram of the detector pixel of FIG. 12 in accordance with an embodiment of the present disclosure.

FIG. 13 illustrates a more detailed implementation of pixel 1' as shown in FIG. 12, in accordance with an embodiment of the present disclosure.

In this embodiment, DCCU 10' comprises comparing circuit 13 that is configured to compare baseline voltage Vbl to output voltage signal Vesa. The result of this comparison is provided to a switch Mc, which is controlled by trigger circuit 9.

In absence of incident photons, trigger circuit 9 controls switch Mc to be active (i.e., conductive or low-impedance), corresponding to DCCU 10' operating in the first mode. In the first mode, switch Mc is configured to act as a relay, connecting the output of comparing circuit 13 to output capacitor C1 and signal generator Mdcc. In turn, signal generator Mdcc generates a dark current compensation signal based on the voltage across output capacitor C1. In this state, comparing circuit 13 can change the voltage across output capacitor C1, and therefore also the dark current compensation signal generated by signal generator Mdcc, based on its input signal. However, when trigger circuit 9 detects that a photon has been incident on photodetector 2, for example based on output voltage signal Vesa of CSA 4, trigger circuit 9 temporarily deactivates switch Mc (i.e., switch Mc becomes non-conductive or forms a high impedance), corresponding to DCCU 10' operating in the second mode. In the second mode, a signal path for the control signal from the output of comparing circuit 13 to signal generator Mdcc is inhibited, and the dark current compensation signal provided by signal generator Mdcc is fixed. For example, output capacitor C1 substantially maintains its charge from when DCCU 10' last operated in the first mode while switch Mc is deactivated. In this manner, signal information due to an incident photon is not or hardly propagated through DCCU 10' and thus does not affect the accuracy of the dark current compensation signal, or hardly so.

Figure 14:
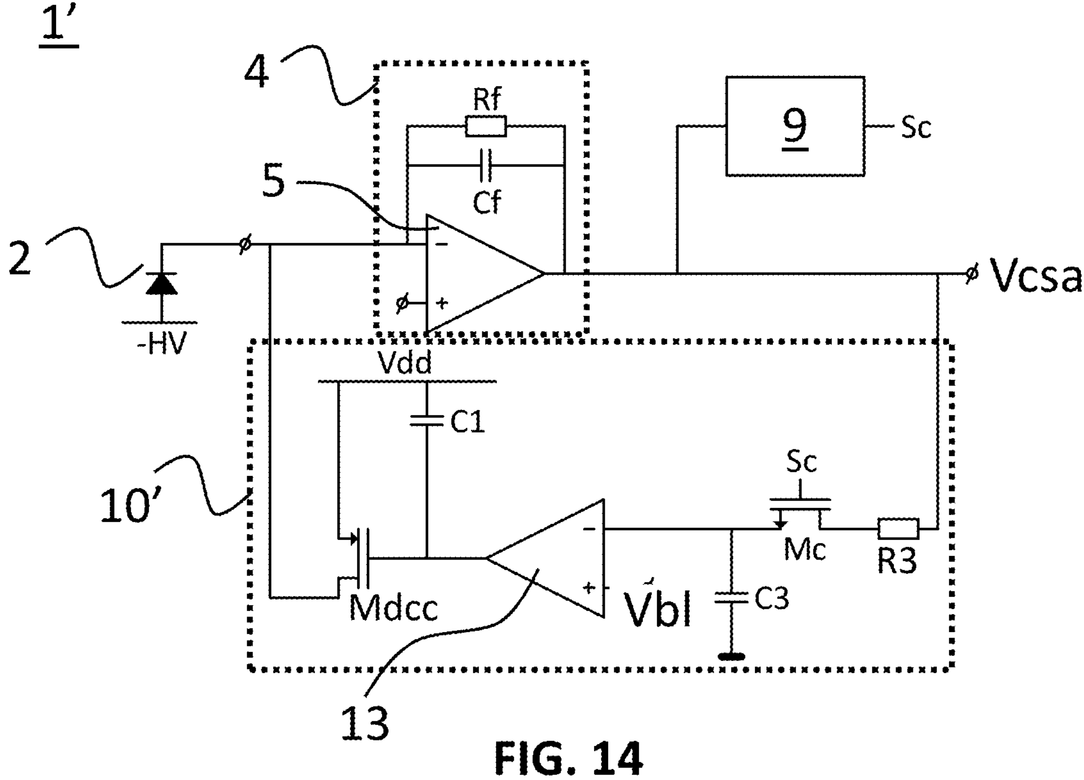
FIG. 14 is a more detailed schematic diagram of the detector pixel of FIG. 12 in accordance with an embodiment of the present disclosure.

FIG. 14 illustrates a more detailed implementation of pixel 1' as shown in FIG. 12, in accordance with another embodiment of the present disclosure. This embodiment differs from the embodiment shown in FIG. 13 in that switch Me is connected between the output of CSA 4 and the input of comparing circuit 13, instead of between the output of comparing circuit 13 and signal generator Mdcc. In addition, an input capacitor C3 is connected to the input of comparing circuit 13.

In this embodiment, input capacitor C3 substantially maintains its charge when DCCU 10' operates in the second mode, in which trigger circuit 9 controls switch Mc to deactivate it. Hence, when DCCU 10' operates in the second mode, the output of comparing circuit 13 no longer changes in dependence of output voltage signal Vesa. Consequently, the dark current compensation signal provided by signal generator Mdcc also does not change when DCCU 10' operates in the second mode. In this manner, signal information due to an incident photon is not or hardly propagated through DCCU 10' and thus does not affect the accuracy of the dark current compensation signal, or hardly so.

Optionally, DCCU 10' may further comprise a resistive element R3 (e.g., resistor) which forms a low-pass filter in conjunction with input capacitor C3 when switch Mc is active and DCCU 10' operates in the first mode. Resistive element R3 may prevent or limit loading of CSA 4 and comparing circuit 13, and/or may prevent or limit kick-back or charge injection from switch Me to the output of CSA 4. Moreover, the low-pass filter formed by resistive element R3 and input capacitor C3 implement a delay in the response of DCCU 10' to changes in output voltage of CSA 4. This delay may be configured to provide trigger circuit 9 with sufficient time to respond accordingly with trigger control signal Sc, before the change in output voltage or at least most of said change has reached input capacitor C3.

Figure 15:
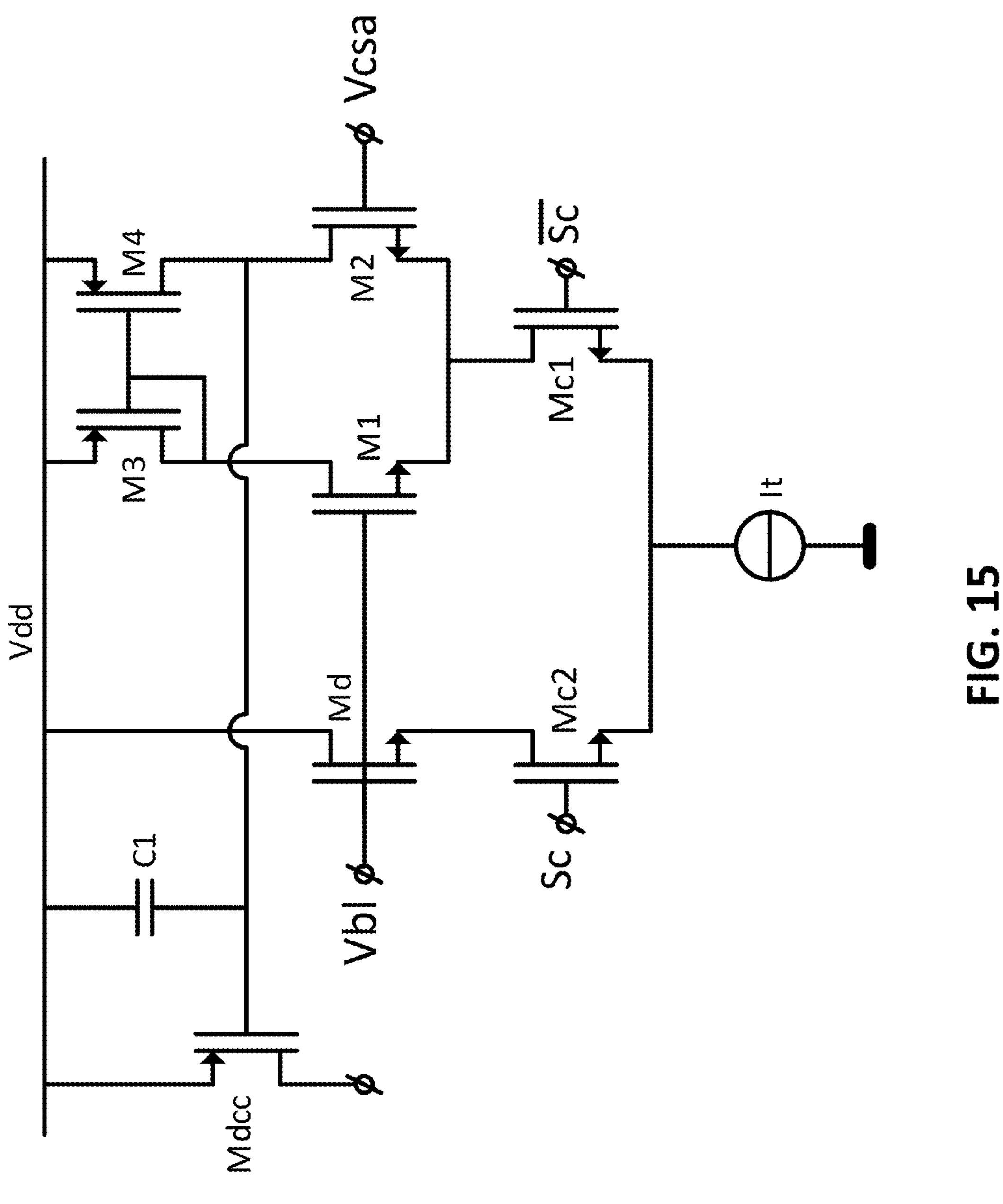
FIG. 15 is a more detailed schematic diagram of a DCCU of the detector pixel of FIG. 12 in accordance with an embodiment of the present disclosure.

FIG. 15 illustrates DCCU 10' according to yet another embodiment of the present disclosure. DCCU 10' may for example replace that of any of FIGS. 12-14.

Here, the comparing circuit is implemented using transistors M1-M4 in a generally similar fashion as comparing circuit 13 of FIG. 15. However, in this case, tail current source It is not directly connected to input transistors M1, M2, but rather it is connected to a first switch Mc1.

First switch Mc1 may be active when DCCU 10' operates in the first mode. Thus, the comparing unit may operate normally when DCCU 10' is operating in the first mode. When trigger circuit 9 controls DCCU 10' to operate in the second mode by deactivating first switch Mc1, the current from tail current source It may be prevented from reaching transistors M1-M4, thereby also deactivating the comparing functionality of the comparing circuit. As a result, the dark current compensation signal is temporarily fixed when DCCU 10' is operating in the second mode, for example by the charge stored on output capacitor C1.

DCCU 10' may further comprise a second switch Mc2 that is controlled by trigger circuit 9 in a complementary manner to first switch Mc1. In other words, when first switch Mc1 is active, second switch Mc2 is inactive, and vice versa. Second switch Mc2 allows the current from tail current source It to flow through a separate branch different from that of transistors M1-M4. Said branch preferably includes a dump transistor Md through which the current from tail current source It is fed. Dump transistor Md may replicate or simulate the potential on the source terminals of transistors M1, M2 so that, on one hand, the capacitance in DCCU 10' associated with the output of tail current source It is not completely discharged and, on the other hand, excess capacitive currents into the differential pair of input transistors M1, M2 are avoided or limited. This can for example be achieved by similarly dimensioning dump transistor Md and providing baseline voltage Vbl to dump transistor Md in addition to transistor M1.

The embodiments of FIGS. 13-15 may be combined, for example by implementing DCCU 10' with switch Mc at the output of comparing circuit 13 as shown in FIG. 13, switch Mc at the input of comparing circuit 13 as shown in FIG. 14, and/or switches Mc1, Mc2 included in comparing circuit 13 as shown in FIG. 15.

Pixel 1 and pixel 1' may be at least partially implemented using discrete components, for example mounted on a printed circuit board (PCB), and/or may be at least partially realized as an integrated circuit (IC). In the latter case, the IC may be provided in device package, for example including a package material, such as molding compound, configured to encapsulate and protect the IC, and leads providing external access to the IC.

In an embodiment, pixel 1 and pixel 1' may each be partially realized as a module comprising a readout IC (ROIC) including signal processing circuitry (e.g., including CSA 4, shaper 6, discriminator bank 7, counter array 8, trigger circuit 9, and/or DCCU 10). In that case, photodetector 2 can be directly attached to a surface of the ROIC and electrically connected to an input of the ROIC. The ROIC can then be mounted on a carrier (e.g., a PCB) and may be electrically connected to an external component using wirebonds on the ROIC. (through-silicon) vias, or the like, as will be appreciated by the skilled person.

The present disclosure may relate to any of the following clauses.

Clause 1. A detector pixel for an energy-resolving photon counting detector, the pixel comprising: a photodetector configured to convert an incident photon into a first signal indicative of an energy of the incident photon: a charge sensitive amplifier, 'CSA', configured to convert the first signal at an input of the CSA into a CSA output signal at an output of the CSA; and a dark current compensation unit, 'DCCU', for compensating a dark current of the photodetector, wherein the DCCU comprises: a signal following unit configured to provide an intermediate signal that is configured to follow a signal indicative of the CSA output signal, with a first maximum signal change rate in a first direction and a second maximum signal change rate, lower than the first maximum signal change rate, in a second direction opposite the first direction, wherein the second direction is a direction in which the signal indicative of the CSA output signal is configured to change when a photon is incident on the photodetector; and a signal generation unit configured to generate a dark current compensation signal based on the intermediate signal and to provide said dark current compensation signal to the CSA.

Clause 2. The pixel according to clause 1, wherein the signal generation unit further comprises a comparing circuit configured to compare the intermediate signal to a reference signal that is based on a baseline level of the CSA, and to output a result representing said comparison for generating the dark current compensation signal, wherein the output of the comparing circuit is the dark current compensation signal, or wherein the output of the comparing circuit is a control signal for controlling a signal generator to generate the dark current compensation signal.

Clause 3. The pixel according to clause 1 or 2, wherein the signal following unit comprises: a first signal changing element configured to change a signal level of the intermediate signal in the first direction in dependence of the signal indicative of the CSA output signal; and a second signal changing element configured to change the signal level of the intermediate signal in the second direction in dependence of the signal indicative of the CSA output signal.

Clause 4. The pixel according to clause 3, wherein the second signal changing element comprises a current source, such as a transistor-implemented current source.

Clause 5. The pixel according to clause 3 or 4, wherein the first signal changing element comprises a source follower transistor, a control terminal of which is either directly or indirectly connected to the output of the CSA.

Clause 6. The pixel according to claims 2 and 5, wherein the signal generation unit further comprises a reference transistor configured to provide the reference signal by level shifting the baseline level to thereby account for a level shift of the intermediate signal with respect to the CSA output signal caused by the source follower transistor.

Clause 7. The pixel according to clauses 4 and 5, and optionally claim 6, wherein the second signal changing element comprises a further source follower transistor of which a channel is arranged in series with the current source, wherein the signal following unit further comprises a buffer connected between the output of the CSA and each of the source follower and further source follower, the buffer being configured to provide a respective level-shifted signal to each of the source follower transistor and the further source follower transistor to thereby account for a level shift caused by said source follower transistor and further source follower transistor, respectively.

Clause 8. The pixel according to clause 3, wherein the first signal changing element comprises a series connection of a first diode and a first resistive element, wherein the second signal changing element comprises a series connection of a second diode and a second resistive element, the second signal changing element being connected in parallel to the first signal changing element, and the second diode being anti-parallel to the first diode, wherein a resistance of the first resistive element is less than a resistance of the second resistive element wherein, preferably, the first diode and the second diode are Schottky diodes.

Clause 9. The pixel according to clause 8, wherein the signal following unit further comprises an amplifier coupled with a first input thereof between the output of the CSA and the first and second signal changing element, wherein the first and second signal changing elements are coupled between an output of the amplifier and an output of the signal following unit, and wherein the output of the signal following unit is coupled to a second input of the amplifier thereby forming a negative feedback loop comprising the amplifier, and the first and second signal changing elements.

Clause 10. The pixel according to clause 3, wherein the first signal changing element comprises a diode connected to the output of the CSA, and wherein the second signal changing element comprises a current source, such as a transistor-implemented current source.

Clause 11. The pixel according to any of the clauses 8-10, in so far as depending on clause 2, wherein the signal generating unit further comprises a reference diode biased with a reference current source and configured to provide the reference signal by level shifting the baseline level to thereby account for a level shift of the intermediate signal with respect to the CSA output signal caused by the diode in so far as depending on claim 10, or caused by the first diode and/or second diode in so far as depending on claim 8 or 9.

Clause 12. The pixel according to any of the clauses 2-11, in so far as depending on clause 2, wherein the signal generating unit further comprises a first capacitor connected between the output of the comparing circuit and a reference terminal.

Clause 13. The pixel according to any of the clauses 1-12, wherein the signal following unit further comprises a second capacitor across which the intermediate signal is provided as a voltage.

Clause 14. The pixel according to any of the clauses 1-13, wherein the CSA comprises an amplifier and a feedback network comprising a parallel connection of a feedback capacitor and a reset element configured to reset the CSA.

Clause 15. The pixel according to clause 14, wherein the reset element comprises: a feedback resistor; or a feedback transistor, wherein the pixel further comprises a trigger circuit configured to generate a reset signal for said feedback transistor in dependence of the CSA output signal.

Clause 16. The pixel according to any of the clauses 1-15, wherein the pixel further comprises: a shaper configured to shape the CSA output signal into a second signal indicative of the energy of the incident photon, wherein the shaper preferably comprises a differentiator and an integrator; a discriminator bank comprising a plurality of comparing units, each comparing unit being configured to compare the maximum value of the second signal with a respective threshold value and to output a result of the comparison; and a counter array comprising a plurality of counters respectively connected to the plurality of comparing units, each counter being configured to cumulatively store the result of the comparison.

Clause 17. The pixel according to any of the clauses 1-16, wherein the photodetector comprises a photo-absorbing material, such as Cadmium Zinc Telluride, 'CZT', or or Cadmium Telluride, 'CdTe'.

Clause 18. The pixel according to any of the clauses 1-17, wherein the photodetector is a photodiode, a phototransistor, or a photoconductor.

Clause 19. The pixel according to any of the clauses 1-18, wherein the CSA output signal is a voltage signal, wherein the intermediate signal is a voltage signal, and wherein the baseline level is a baseline voltage.

Clause 20. The pixel according to any of the clauses 1-19, wherein the signal indicative of the CSA output signal is the CSA output signal or a transformed version thereof, such as a scaled and/or level-shifted version thereof.

Clause 21. An energy-resolving photon counting detector comprising one or more detector pixels as defined in any of the clauses 1-20, said one or more detector pixels preferably comprising a plurality of detector pixels arranged in a matrix of rows and columns.

Clause 22. A detector pixel for an energy-resolving photon counting detector, the pixel comprising: a photodetector configured to convert an incident photon into a first signal indicative of an energy of the incident photon; a charge sensitive amplifier, 'CSA', configured to convert the first signal at an input of the CSA into a CSA output signal at an output of the CSA; and a dark current compensation unit, 'DCCU', configured to be operable in: a first mode, in which the DCCU is configured to generate a dark current compensation signal in dependence of a difference between a baseline level of the CSA and a signal level of the CSA output signal or a signal indicative thereof; and a second mode, in which the DCCU is configured to substantially maintain a signal level of the dark current compensation signal regardless of the CSA output signal; and a trigger circuit configured to detect that a photon has been incident on the photodetector, and to control the DCCU to temporarily operate in the second mode before operating in the first mode again.

Clause 23. The pixel according to clause 22, wherein the DCCU comprises: a comparing circuit configured to compare the CSA output signal or a signal indicative thereof to the baseline level of the CSA, and to output a control signal in dependence of a result of said comparison; and a signal generator configured to generate the dark current compensation signal based on said control signal.

Clause 24. The pixel according to clause 22 or 23, wherein the DCCU further comprises one or more switches configured to, in the second mode, disable a signal path between the output of the CSA to the signal generator, and wherein the trigger circuit is configured to activate said one or more switches using a trigger control signal to control the DCCU to operate in the second mode.

Clause 25. The pixel according to clauses 23 and 24, wherein at least one of the one or more switches is connected between the output of the CSA and an input of the comparing circuit, wherein the DCCU further comprises an input capacitive element connected to the input of the comparing circuit and configured to substantially maintain its charge when the DCCU is operating in the second mode.

Clause 26. The pixel according to clause 25, wherein the DCCU further comprises a resistive element connected between the output of the CSA and the input capacitive element, wherein the resistive element and the input capacitive element together form a low-pass filter.

Clause 27. The pixel according to clauses 23 and 24, and optionally clause 24 or 25, wherein at least one of the one or more switches is connected between an output of the comparing circuit and the signal generator, wherein the DCCU further comprises an output capacitor connected to a control terminal of the signal generator and configured to substantially maintain its charge when the DCCU is operating in the second mode.

Clause 28. The pixel according to clauses 23 and 24, and optionally any one of clauses 25-27, wherein at least one of the one or more switches is comprised in the comparing circuit, wherein the DCCU further comprises an output capacitor connected to a control terminal of the signal generator and configured to substantially maintain its charge when the DCCU is operating in the second mode.

Clause 29. The pixel according to clause 28, wherein the comparing unit comprises an amplifier including a differential pair of input transistors, a first input transistor thereof being connected to the output of the CSA, and a second input transistor thereof being provided with the baseline level, wherein the amplifier further comprises a tail current source, and wherein, in the second mode, the at least one of the one or more switches is configured to disable a current path from the tail current source to the differential pair of input transistors.

Clause 30. The pixel according to clause 29, wherein, in the second mode, the at least one of the one or more switches provide a current path from the tail current source to a separate branch different from a branch corresponding to the differential pair of input transistors, said separate branch preferably including a transistor configured to replicate a potential across the differential pair of input transistors.

Clause 31. The pixel according to any of the clauses 22-30, wherein a duration of temporarily operating in the second mode is based on a time period required for the pixel to process the first signal.

Clause 32. The pixel according to any of the clauses 22-31, wherein the CSA comprises an amplifier and a feedback network comprising a parallel connection of a feedback capacitor and a reset element configured to reset the CSA.

Clause 33. The pixel according to clause 32, wherein the reset element comprises: a feedback resistor; or a feedback transistor, and wherein the trigger circuit is further configured to generate a reset signal for said feedback transistor in dependence of the CSA output signal, or an intermediate signal reflecting said CSA output signal.

Clause 34. The pixel according to any of the clauses 22-33, further comprising: a shaper configured to shape the CSA output signal into a second signal indicative of the energy of the incident photon, wherein the shaper preferably comprises a differentiator and an integrator; a discriminator bank comprising a plurality of comparing units, each comparing unit being configured to compare the maximum value of the second signal with a respective threshold value and to output a result of the comparison; and a counter array comprising a plurality of counters respectively connected to the plurality of comparing units, each counter being configured to cumulatively store the result of the comparison.

Clause 35. The pixel according to any of the clauses 22-34, wherein the photodetector comprises a photo-absorbing material, such as Cadmium Zinc Telluride, 'CZT', or Cadmium Telluride 'CdTe'.

Clause 36. The pixel according to any of the clauses 22-35, wherein the photodetector is a photodiode, a phototransistor, or a photoconductor.

Clause 37. The pixel according to any of the clauses 22-36, wherein the CSA output signal is a voltage signal, and wherein the baseline level is a baseline voltage.

Clause 38. An energy-resolving photon counting detector comprising one or more detector pixels as defined in any of the clauses 22-37, said one or more detector pixels preferably comprising a plurality of detector pixels arranged in a matrix of rows and columns.

The above description provides preferred exemplary embodiments only, and is not intended to limit the scope, applicability, or configuration of the present disclosure. Rather, the description of the preferred exemplary embodiments will provide those skilled in the art with an enabling description for implementing a preferred exemplary embodiment of the present disclosure, it being understood that various changes may be made in the function and arrangement of elements, including various modifications and/or combinations of features from different embodiments, without departing from the scope of the present disclosure as defined by the appended claims.

The invention claimed is:

1. A detector pixel for an energy-resolving photon counting detector, the pixel comprising:

a photodetector configured to convert an incident photon into a first signal indicative of an energy of the incident photon;

a charge sensitive amplifier, (CSA), configured to convert the first signal at an input of the CSA into a CSA output signal at an output of the CSA; and a dark current compensation unit, (DCCU), for compensating a dark current of the photodetector, wherein the DCCU comprises:

a signal following unit configured to provide an intermediate signal that is configured to follow a signal indicative of the CSA output signal, with a first maximum signal change rate in a first direction and a second maximum signal change rate, lower than the first maximum signal change rate, in a second direction opposite the first direction, wherein the second direction is a direction in which the signal indicative of the CSA output signal is configured to change when a photon is incident on the photodetector; and a signal generation unit configured to generate a dark current compensation signal based on the intermediate signal and to provide said dark current compensation signal to the CSA.

2. The pixel according to claim 1, wherein the signal generation unit further comprises a comparing circuit configured to compare the intermediate signal to a reference signal that is based on a baseline level of the CSA, and to output a result representing said comparison for generating the dark current compensation signal, wherein the output of the comparing circuit is the dark current compensation signal, or wherein the output of the comparing circuit is a control signal for controlling a signal generator to generate the dark current compensation signal.

3. The pixel according to claim 1, wherein the signal following unit comprises:

a first signal changing element configured to change a signal level of the intermediate signal in the first direction in dependence of the signal indicative of the CSA output signal; and a second signal changing element configured to change the signal level of the intermediate signal in the second direction in dependence of the signal indicative of the CSA output signal.

4. The pixel according to claim 3, wherein the second signal changing element comprises a current source, such as a transistor-implemented current source.

5. The pixel according to claim 3, wherein the first signal changing element comprises a source follower transistor, a control terminal of which is either directly or indirectly connected to the output of the CSA.

6. The pixel according to claim 2, wherein the signal following unit comprises:

a first signal changing element configured to change a signal level of the intermediate signal in the first direction in dependence of the signal indicative of the CSA output signal; and a second signal changing element configured to change the signal level of the intermediate signal in the second direction in dependence of the signal indicative of the CSA output signal, wherein the first signal changing element comprises a source follower transistor, a control terminal of which is either directly or indirectly connected to the output of the CSA, and wherein the signal generation unit further comprises a reference transistor configured to provide the reference signal by level shifting the baseline level to thereby account for a level shift of the intermediate signal with respect to the CSA output signal caused by the source follower transistor.

7. The pixel according to claim 4, wherein the signal following unit comprises:

a first signal changing element configured to change a signal level of the intermediate signal in the first direction in dependence of the signal indicative of the CSA output signal; and a second signal changing element configured to change the signal level of the intermediate signal in the second direction in dependence of the signal indicative of the CSA output signal, wherein the first signal changing element comprises a source follower transistor, a control terminal of which is either directly or indirectly connected to the output of the CSA, and wherein the second signal changing element comprises a further source follower transistor (Msf-2) of which a channel is arranged in series with the current source, wherein the signal following unit further comprises a buffer connected between the output of the CSA and each of the source follower and further source follower, the buffer being configured to provide a respective level-shifted signal to each of the source follower transistor and the further source follower transistor to thereby account for a level shift caused by said source follower transistor and further source follower transistor, respectively.

8. The pixel according to claim 3, wherein the first signal changing element comprises a series connection of a first diode and a first resistive element, wherein the second signal changing element comprises a series connection of a second diode and a second resistive element, the second signal changing element being connected in parallel to the first signal changing element, and the second diode being anti-parallel to the first diode, wherein a resistance of the first resistive element is less than a resistance of the second resistive element.

9. The pixel according to claim 8, wherein the signal following unit further comprises an amplifier coupled with a first input thereof between the output of the CSA and the first and second signal changing element, wherein the first and second signal changing elements are coupled between an output of the amplifier and an output of the signal following unit, and wherein the output of the signal following unit is coupled to a second input of the amplifier thereby forming a negative feedback loop comprising the amplifier, and the first and second signal changing elements.

10. The pixel according to claim 3, wherein the first signal changing element comprises a diode connected to the output of the CSA, and wherein the second signal changing element comprises a current source, such as a transistor-implemented current source.

11. The pixel according to claim 10, wherein the signal generating unit further comprises a reference diode biased with a reference current source and configured to provide the reference signal by level shifting the baseline level to thereby account for a level shift of the intermediate signal with respect to the CSA output signal caused by the diode.

12. The pixel according to claim 2, wherein the signal generating unit further comprises a first capacitor connected between the output of the comparing circuit and a reference terminal, or wherein the signal following unit further comprises a second capacitor across which the intermediate signal is provided as a voltage.

13. The pixel according to claim 1, wherein the CSA comprises an amplifier and a feedback network comprising a parallel connection of a feedback capacitor and a reset element configured to reset the CSA, wherein the reset element comprises a feedback resistor, or wherein the reset element comprises a feedback transistor and wherein the pixel further comprises a trigger circuit configured to generate a reset signal for said feedback transistor in dependence of the CSA output signal.

14. The pixel according to claim 1, wherein the photodetector comprises a photo-absorbing material, wherein the photodetector is a photodiode, a phototransistor, or a photoconductor, wherein the CSA output signal is a voltage signal, wherein the intermediate signal is a voltage signal, and wherein the baseline level is a baseline voltage or wherein the signal indicative of the CSA output signal is the CSA output signal or a transformed version thereof, such as a scaled and/or level-shifted version thereof.

15. An energy-resolving photon counting detector comprising one or more detector pixels as defined in claim 1.

16. The pixel according to claim 8, wherein the first diode and the second diode are Schottky diodes.

17. The pixel according to claim 8, wherein the signal generating unit further comprises a reference diode biased with a reference current source and configured to provide the reference signal by level shifting the baseline level to thereby account for a level shift of the intermediate signal with respect to the CSA output signal caused by the first diode and/or the second diode.

18. The pixel according to claim 1, wherein the pixel further comprises:

a shaper configured to shape the CSA output signal into a second signal indicative of the energy of the incident photon, wherein the shaper comprises a differentiator and an integrator;

a discriminator bank comprising a plurality of comparing units, each comparing unit being configured to compare the maximum value of the second signal with a respective threshold value and to output a result of the comparison; and a counter array comprising a plurality of counters respectively connected to the plurality of comparing units, each counter being configured to cumulatively store the result of the comparison.

19. The pixel according to claim 14, wherein the photo-absorbing material comprises Cadmium Zinc Telluride or Cadmium Telluride.

20. The energy-resolving photon counting detector according to claim 15, wherein the one or more detector pixels comprise a plurality of detector pixels arranged in a matrix of rows and columns.

* * * * *